US006834108B1

(12) United States Patent
Schmidt

(10) Patent No.: US 6,834,108 B1
(45) Date of Patent: Dec. 21, 2004

(54) METHOD FOR IMPROVING ACOUSTIC NOISE ATTENUATION IN HAND-FREE DEVICES

(75) Inventor: Gerhard Schmidt, Dreieich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/622,270

(22) PCT Filed: Jan. 21, 1999

(86) PCT No.: PCT/DE99/00151

§ 371 (c)(1),
(2), (4) Date: Jan. 29, 2001

(87) PCT Pub. No.: WO99/36327

PCT Pub. Date: Jul. 22, 1999

(30) Foreign Application Priority Data

Feb. 13, 1998 (DE) ......................................... 198 06 015

(51) Int. Cl.[7] ............................ H04M 9/08; H04M 9/00
(52) U.S. Cl. ............. 379/406.01; 379/392; 379/406.08; 379/406.12; 379/406.14
(58) Field of Search ....................... 379/406.01, 406.05, 379/406.06, 406.07, 406.08, 406.14, 410, 411, 420, 406.12

(56) References Cited

U.S. PATENT DOCUMENTS 5,774,561 A * 6/1998 Nakagawa et al. ........... 381/66
5,806,025 A * 9/1998 Vis et al. ..................... 704/226
5,894,513 A * 4/1999 Nasu ....................... 379/388.07
6,205,124 B1 * 3/2001 Hamdi ........................ 370/260
6,246,760 B1 * 6/2001 Makino et al. ......... 379/406.08

OTHER PUBLICATIONS

Valérie Turbin et al.: "Comparison Of Three Post–Filtering Algorithms For Residual Acoustic Echo Reduction", 1997 IEEE International Conference on Acoustics, Speech, and Signal Processing, Munich Apr. 21–24, 1997, vol. 1, pp. 307–310, XP–000789176.

* cited by examiner

Primary Examiner—Curtis Kuntz
Assistant Examiner—Tuan Pham
(74) Attorney, Agent, or Firm—Laurence A. Greenberg; Werner H. Stemer; Gregory L. Mayback

(57) ABSTRACT

The present invention relates to a method for improving acoustic noise attenuation, in which the method includes an adaptive control for partial-band echo compensation as well as global-band post-filtering for suppressing residual echo in hand-free devices. This method also uses a level balance as well as controllable frequency-selective echo compensation with partial-band processing. After the frequency-selective echo compensation, the signal is submitted to a post-filtering in another frequency-selective filter using a Wiener-equation adjustment algorithm (Wiener filtering). A single control value (increment vector) is used for controlling both the frequency-selective echo compensation and the other filter. This method can thus be implemented with a very reduced amount of calculations so that it can also be used in simple consumer-directed processors.

11 Claims, 17 Drawing Sheets

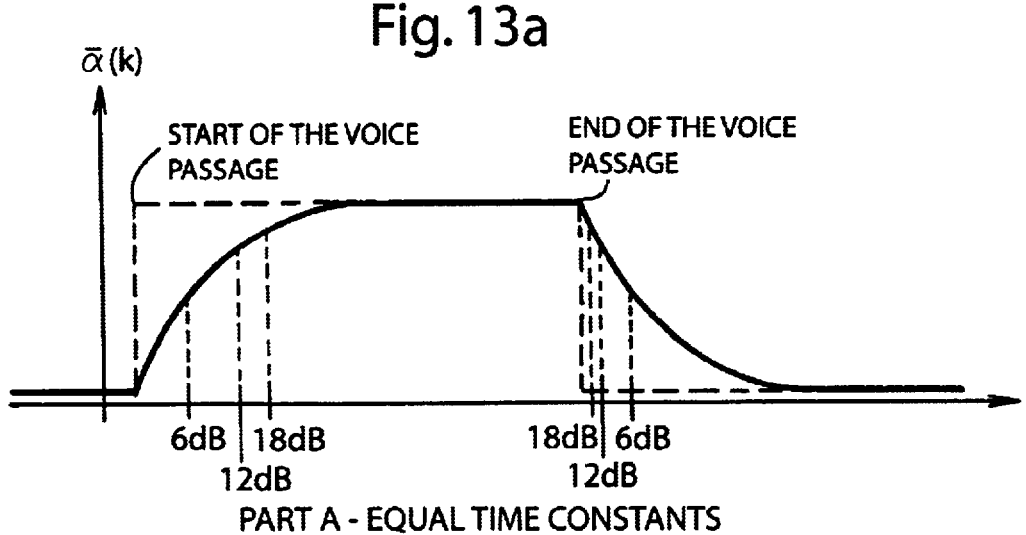
PART A - EQUAL TIME CONSTANTS
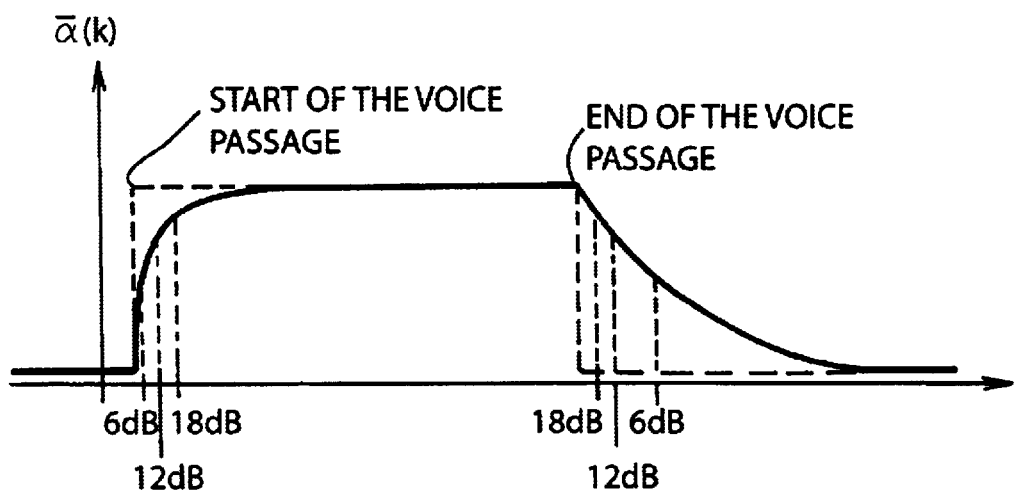
PART B - DIFFERENT TIME CONSTANTS
Fig. 13b

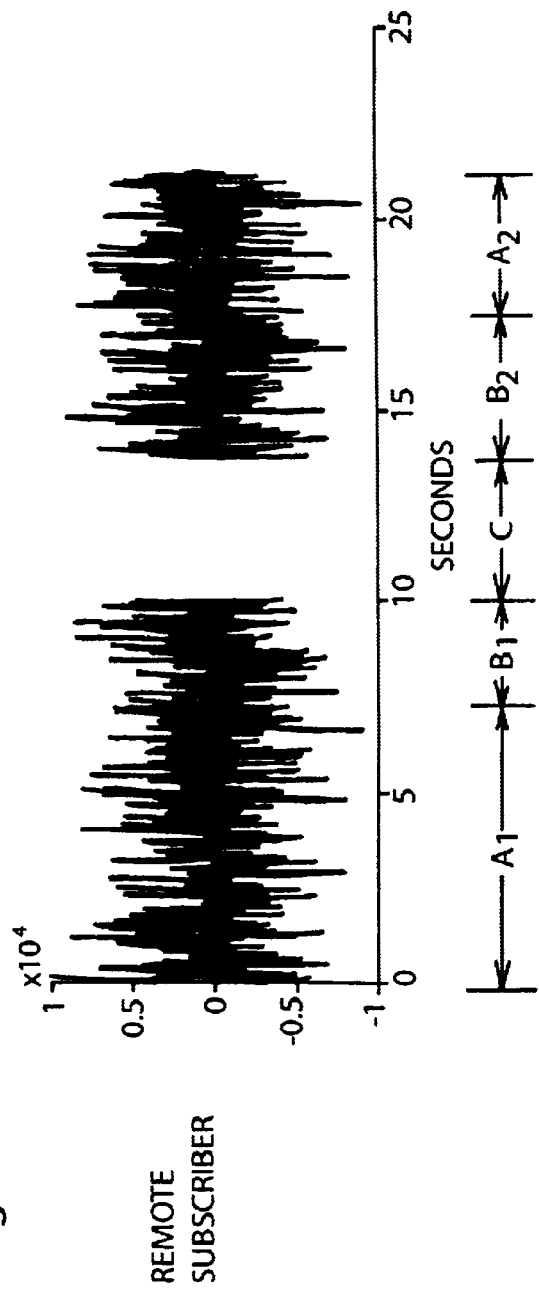
Fig. 14a  REMOTE SUBSCRIBER
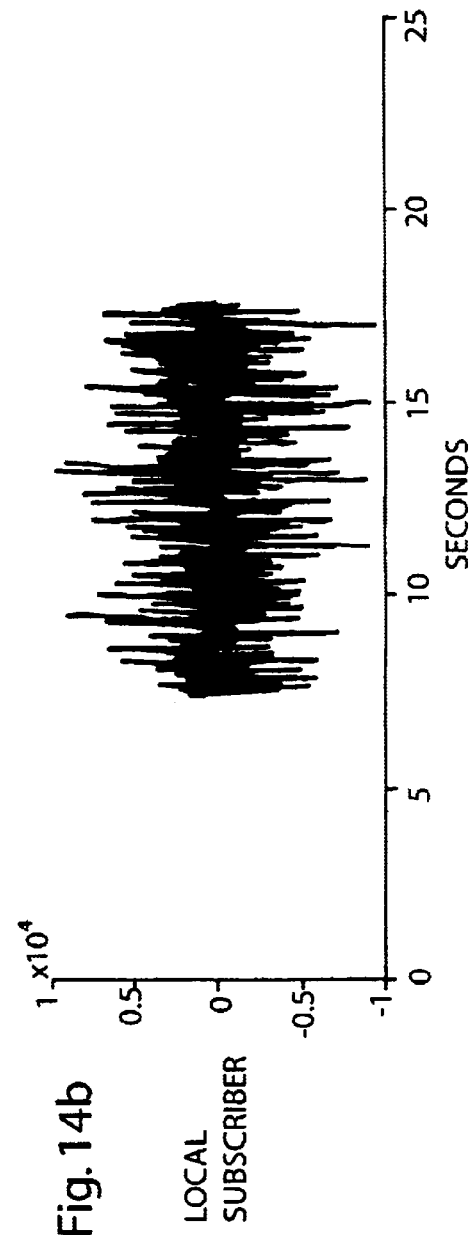
Fig. 14b  LOCAL SUBSCRIBER

METHOD FOR IMPROVING ACOUSTIC NOISE ATTENUATION IN HAND-FREE DEVICES

BACKGROUND OF THE INVENTION

Field of the Invention

The present invention relates to a method for improving the acoustic sidetone suppression in hands-free telephones, having a level discriminator, frequency-selective, controllable echo cancellation with subband processing and a residual-error post filtering.

In the case of hands-free telephones it is absolutely necessary to suppress the signals of the remote subscriber which are emitted by the loudspeaker and therefore received again by the microphone, since otherwise unpleasant echoes disturb the connection. Until now, it has been customary for the purpose of suppressing these echoes, that is to say for the purpose of acoustic sidetone suppression, to provide a level discriminator which strongly damps the transmitting or receiving path as a function of the call situation. However, this renders duplex (full duplex mode) virtually impossible.

It has already been attempted using the prior art to date to make an adequate sidetone suppression available despite acceptable duplex mode properties. For this purpose, frequency-selective, controllable echo cancellation is provided in addition to the level discriminator. In this regard, reference is made to the as yet unpublished patent application DE 197 14 966 of the applicant. Other methods are described, for example, in the NEC advertising brochure "RefleXion™ Acoustic Echo Canceller on the μPD7701x Family", 1996, or in the description of the Motorola DSP5600x digital processor (M. Knox, P. Abbott, Cyox: A Highly Integrated H320 Audiosubsystem using the Motorola DSP5600x Digital Processor). However, given the long signal propagation times of video conference links, and/or in the case of GSM links, these methods also do not offer adequate echo suppression if the aim is simultaneously for a duplex to be possible.

It has therefore already been proposed to provide an additional post-filtering downstream of the frequency-selective echo cancellation with the aid of subband processing. Such a post filtering is known, for example, from the article "V. Turbin, A. Gilloire, P. Scalart: Comparison Of Three Post-Filtering Algorithms For Residual Acoustic Echo Reduction" ICASSP97, International Workshop on Acoustic Speech and Signal Processing, Munich 1997, or from the article by R. Martin "An improved Echo-shape Algorithm for Acoustic Echo Control", EUSIPCO96, 8th European Signal Processing Conference, Triest, Italy, 1996. So far, these concepts could only be implemented with difficulty, since it is necessary, after all, to provide digital signal processing both for the echo cancellation with the aid of subband processing and for the post filtering, and the computing performance required for this cannot be delivered with acceptable outlay by the processors currently available.

SUMMARY OF THE INVENTION

It is therefore the object of the invention to specify a method for improving the acoustic sidetone suppression in hands-free telephones, in the case of which the computational outlay is minimized such that it is possible to implement both a frequency-selective echo cancellation with the aid of subband processing, and the required post filtering on customary "consumer processors". This object is achieved with the aid of a method having the features of Patent Claim 1. Advantageous refinements of this method are specified in the subclaims.

According to the invention, therefore, use is made only of a single controlled variable, specifically the step-size vector, both for controlling the frequency-selective echo cancellation, and for controlling the further filter. Use can preferably be made in this case of a plurality of different sampling rates. The computational outlay can be further reduced thereby.

It is likewise preferred to use adaptive filters both for the echo cancellation and for the further filter.

The echo cancellation is preferably implemented by means of a filter bank in frequency subbands.

Preferably both power-based estimates and correlation-based analyses are used for controlling the adaptation or step size.

It is likewise preferred for power transmission factors to be estimated in subbands in order to determine the step size.

It is likewise preferred for both the echo cancellers and the residual-error post filtering to supply the estimated values for the return loss introduced by them, since these estimated values can preferably be used for controlling the attenuation of the level discriminator. Consequently, the attenuation to be introduced by the level discriminator can be further reduced, and thus the call quality can be further improved in the case of duplex.

It is additionally preferred to detect the simultaneous activity of both call participants (duplex). It is then possible, for example, to reduce the overall attenuation of the level discriminator in the case of duplex, in order further to improve the full duplex mode of the hands-free telephone.

The present invention is described in more detail below with the aid of the exemplary embodiment illustrated in the attached drawings, in which:

BRIEF DESCRIPTION OF THE DRAWINGS

FIG. 13 shows the smoothing according to the invention of the step sizes (part A for equal time constants, part B for different time constants);

FIG. 14 shows a further example of the signals of the remote and the local subscribers, on which the processing in the further figures is based;

DESCRIPTION OF THE PREFERRED EMBODIMENTS

Figure 1:
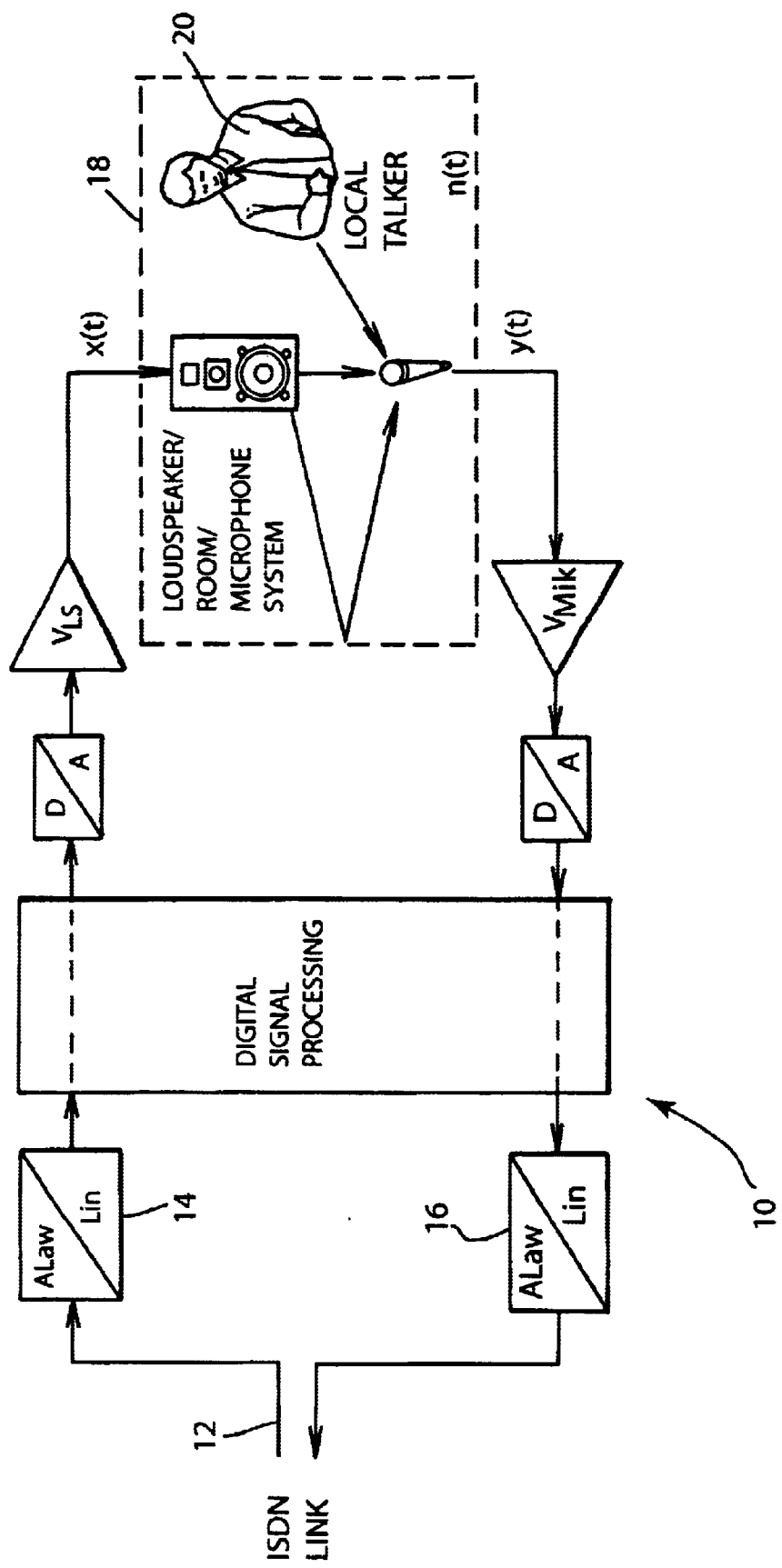
FIG. 1 shows a simplified model of a hands-free telephone with connection to a digital link.

A simplified model of a hands-free telephone 10 with connection to a digital link 12 is illustrated in FIG. 1. The A Law coding or decoding used in the European ISDN network is illustrated in the two left-hand blocks 14, 16. Sketched on the right-hand side is the loudspeaker/room microphone system 18 (LRM system) with the local call participant 20, the user of the hands-free telephone.

The acoustic coupling between the loudspeaker and the microphone causes crosstalk via the LRM system. This crosstalk is received by the remote subscriber as an objectionable echo. In this case, acoustic waves emerge from the loudspeaker and propagate in the room. Reflection at the walls and other objects located in the room produce a plurality of propagation paths which give rise to different propagation times of the loudspeaker signal. The echo signal at the microphone therefore comprises the overlapping of a multiplicity of echo components and, as the case may be, the useful signal n(t): the local talker.

The link between the subscribers can also produce echoes at transitions between different transmission systems. However, the network providers attempt to take special measures against such echo sources directly at the critical points, and so these echoes can be ignored here. Termination echoes, which are produced in telephones with an analogue interface owing to mismatching of the artificial line to the line impedance can be left out of consideration in the case of the use of digital links.

Figure 2:
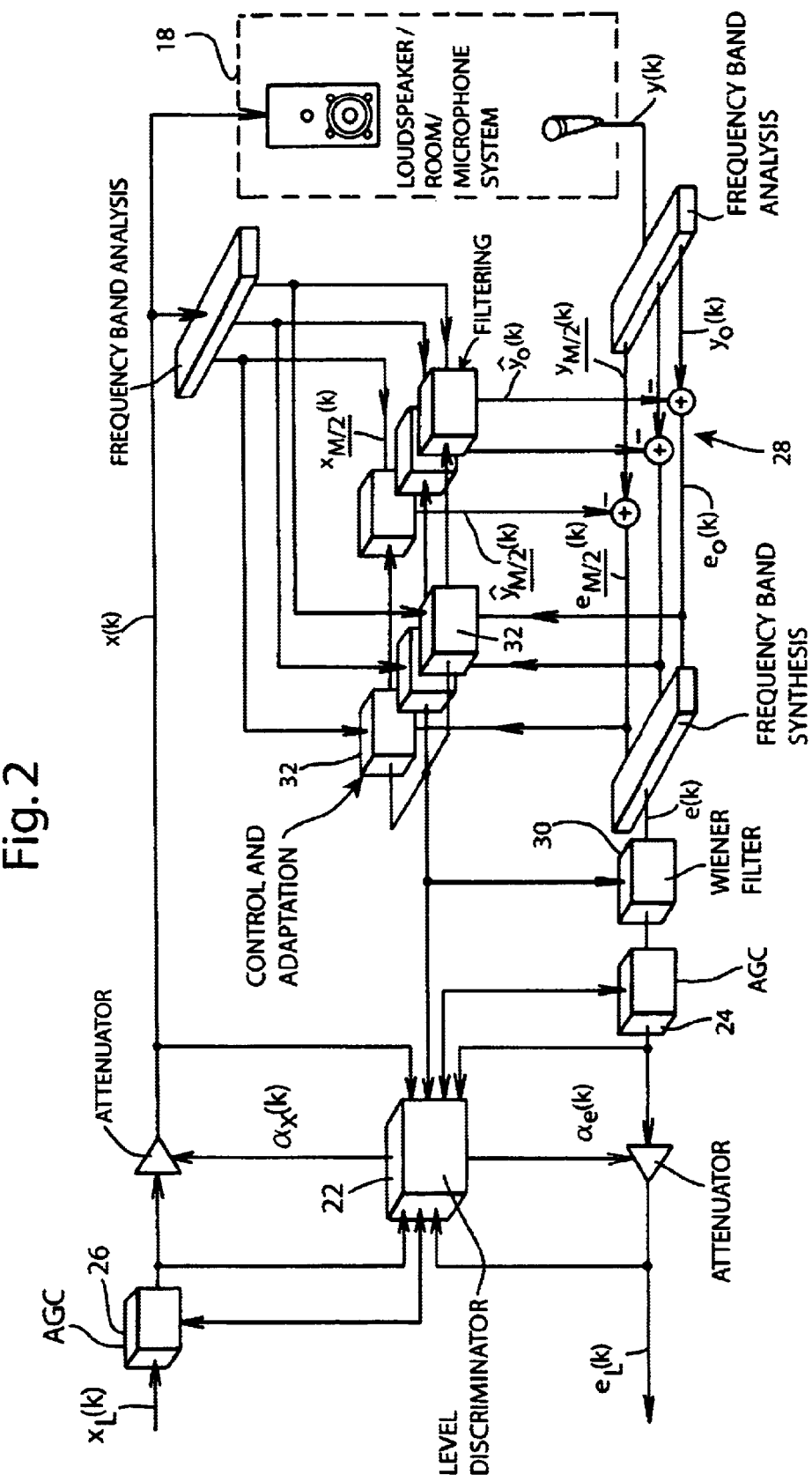
FIG. 2 shows a block diagram of the hands-free telephone according to the invention.

An overview of a hands-free telephone is illustrated in FIG. 2. The central element is a level discriminator 22 which is illustrated in the left-hand part of FIG. 2. Optionally, two automatic gain controls (AGC) 24, 26 can be connected into the transmitting path and the receiving path. The level discriminator 22 guarantees the minimum attenuations prescribed by the ITU or ETSI recommendations by inserting attenuations into the transmitting path and/or the receiving path as a function of the call situation. In the case of activity of the remote subscriber, the receiving path is cleared and a signal of the remote subscriber is output on the loudspeaker without attenuation. The echoes produced in the case of disconnected or poorly compensated cancellers are greatly reduced by the attenuation inserted into the transmitting path. The situation is reversed in the case of activity of the local talker.

Whereas the receiving path is strongly attenuated, the level discriminator 22 inserts no attenuation into the transmitting path, and the signal of the local talker is transmitted without attenuation. Controlling the level discriminator becomes more difficult in the duplex case. Here, both paths (and thus also the subscriber signals) in each case receive half the attenuation to be inserted, or in the case of non-optimum control at least one of the two signal paths is attenuated. Consequently, duplex is not possible, or possible only in a restricted fashion.

The use of adaptive echo cancellers 28—illustrated in the right-hand part of FIG. 2—provides a remedy here. These attempt to balance the LRM system digitally, in order then to remove the echo component of the remote subscriber from the microphone signal. The overall attenuation to be inserted by the level discriminator can be reduced depending on how well the cancellers accomplish this.

The echo cancellation was implemented in frequency subbands, the width of the individual bands preferably being between 250 Hz and 500 Hz given an 8 kHz sampling rate, or between 500 Hz and 1000 Hz given a 16 kHz sampling rate. There are several advantages to the use of frequency-selective echo cancellation. On the one hand, the system can be operated as a multi-rate system by using undersampling and oversampling, the result being a reduction in the computational outlay. On the other hand, the "cancellation power" can be distributed differently over the individual frequency bands owing to the subband breakdown, the result being to achieve effective adaptation of the "cancellation power" to voice signals. Furthermore, the subband processing has a decorrelating action when the overall band processing is compared with the individual subband systems. For voice signals, this signifies an increase in the convergence rate of the adaptive filters. Alongside these advantages, the disadvantage of subband processing must not be ignored. The breakdown of a signal into individual frequency bands always entails a propagation time—in the present preferred method 32 ms given a sampling rate of 8 kHz or 16 ms given a sampling rate of 16 kHz. However, since the method is being used for video conferences and/or in GSM mobile telephones, such propagation times are permissible.

Figure 3:
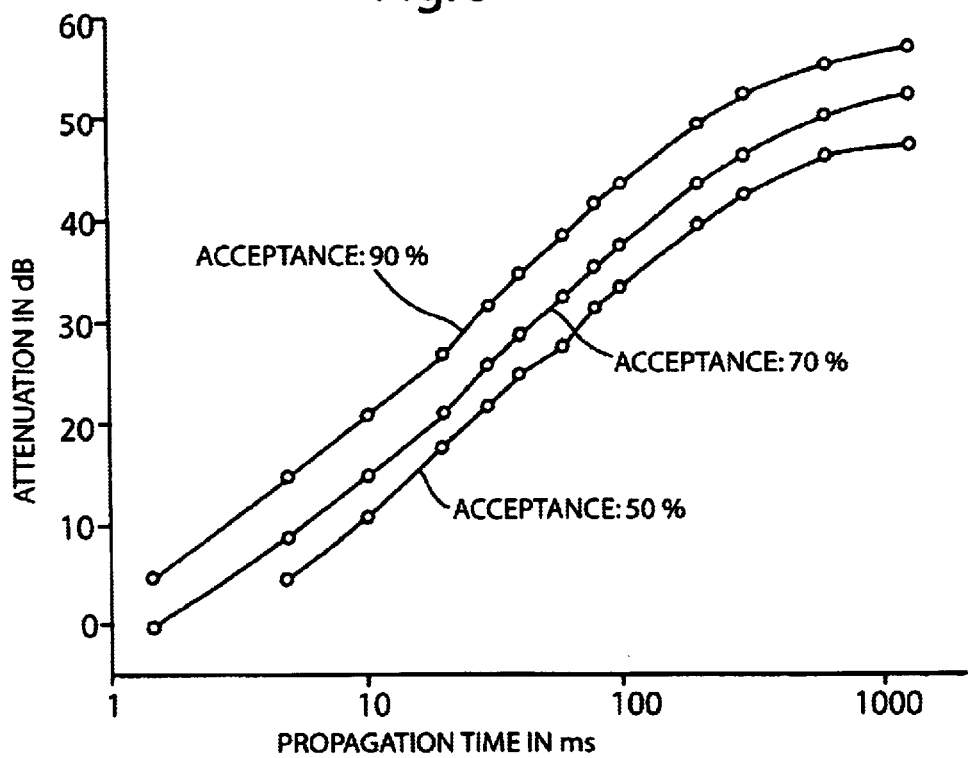
FIG. 3 shows curves for the attenuation requirements placed on the hands-free telephone, as a function of the echo propagation time.

In video conference systems, the propagation time is determined chiefly by the image-processing components. Since the aim in general is to output the image and sound of the remote subscriber to the local subscriber with the lips synchronized, the propagation time of the acoustic echoes can increase to several hundred milliseconds. FIG. 3 illustrates the results of a study in which an attempt was made to find out which return loss dependent on the propagation time of this echo is necessary so that 90, 70 or 50 percent of those asked would be satisfied with the call quality.

Based on this study, a return loss of only 35 dB is necessary in the case of the pure audio propagation time of 30–40 ms (given a sampling rate of 8 kHz) . In the case of lip-synchronous emission of image and sound and a propagation time associated therewith of 300 ms, for example, there is an increase in the requirement to 53 dB. In the case of GSM links, as well, the propagation time can be more than 100 ms. The requirements which are placed on echo cancellation methods in video conference and GSM systems are therefore higher than the requirements placed on conventional hands-free telephones.

Since the echo cancellers are of limited power and cannot reach such high return losses with the hardware available, a so-called post-filter 30 has been introduced. This evaluates the step sizes of the individual subbands together with the other detector results and filters the synthesis filter output signal once more in a frequency-selective fashion. Since the setting algorithm of the filter 30 has been designed in accordance with a Wiener approach, this post-filtering is also denoted below as Wiener filtering.

The control of the echo cancellers is performed in several stages. All performance-based control units 32 operate for each compensator autonomously, that is to say independently of the remaining frequency bands. Consequently, in FIG. 2 a dedicated adaptation and control unit 32 is sketched in for each compensator. The control stage based on correlation analyses of the loudspeaker and microphone signals is used to detect duplex, and therefore evaluated in like fashion in all frequency bands. A further stage takes account of the accuracy as limited by the fixed point calculation and controls the adaptation as a function of the drive level.

The final duplex detection is likewise performed separately with the aid of a dedicated unit which is based both on the detectors of the level discriminator and on those of the echo cancellers. This unit causes the level discriminator to reduce once again the overall attenuation to be inserted (in accordance with ITU Recommendation G.167) in duplex situations.

Figure 4:
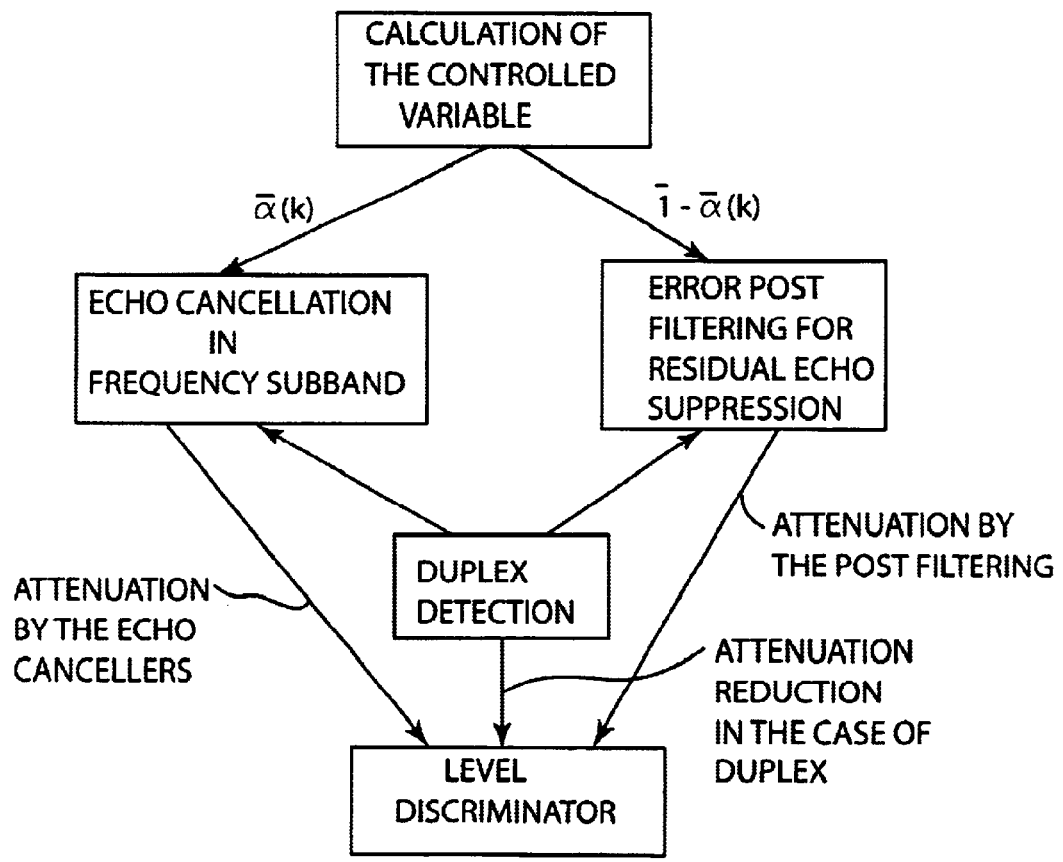
FIG. 4 shows an overview of the method according to the invention.

An overview of the above-described situation is reproduced in FIG. 4. The central element in this case is the calculation of the step-size vector $\overline{\alpha}(k)$. The latter is used both for controlling the subband echo cancellers and for calculating the coefficients of the post-filter. The two partial methods in each case calculate the return loss caused by them and communicate this information to the level discriminator 22. The discriminator 22 then reduces the overall attenuation set by the user, and inserts only the residual attenuation into the transmitting and receiving paths, respectively.

Since the present invention relates to the combination of the abovementioned Wiener filtering and the adaptation control of the subband echo cancellers, the two methods are described in detail in separate chapters. A novel feature of the approach presented is the use of a single controlled variable—the step-size vector $\overline{\alpha}(k)$—for both methods. The computational outlay thereby reduced (less than 100 cycles/sampling clock pulse for the post filtering) renders it possible to implement both methods on cost-effective "consumer" signal processors, and thereby to increase the quality of the hands-free telephone.

Previous approaches to error post filtering firstly use an (expensive) FFT analysis or other methods of calculation with intensive use of computing power, and always regard the control of the post filtering separately from the control of the echo cancellation.

The frequency band analysis and synthesis required for the subband processing is implemented as a polyphase filter bank.

First step—initially independently of the later use within the Wiener filtering—is to describe a step-size control which ensures quick and stable adaptation of the subband echo cancellers. Also presented are methods which estimate the return loss achieved. The level discriminator 22 can therefore reduce the overall attenuation—doing so on the basis of these estimated values. It is of no consequence in this case for the estimation of attenuation whether the attenuation is achieved by well compensated echo cancellers, by the acoustic arrangement of loudspeaker and microphone, or by an appropriate selection of the analogue gains.

Figure 5:
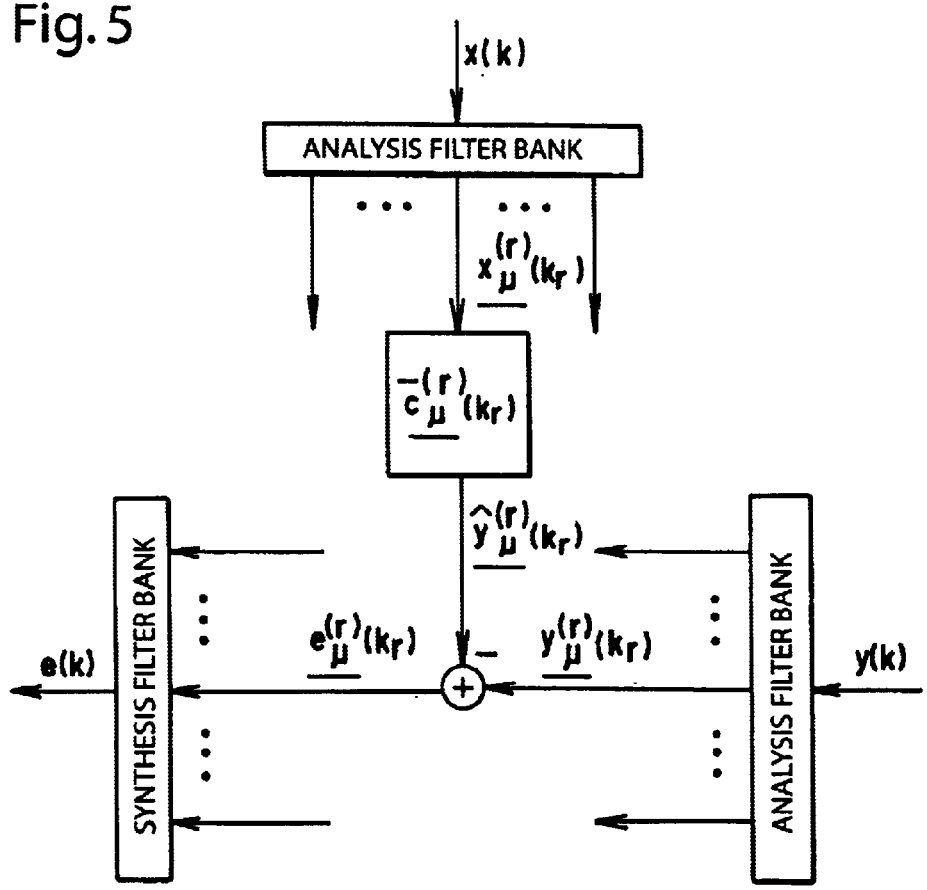
FIG. 5 shows the structure of the adaptation of the subband echo cancellers.
Figure 6:
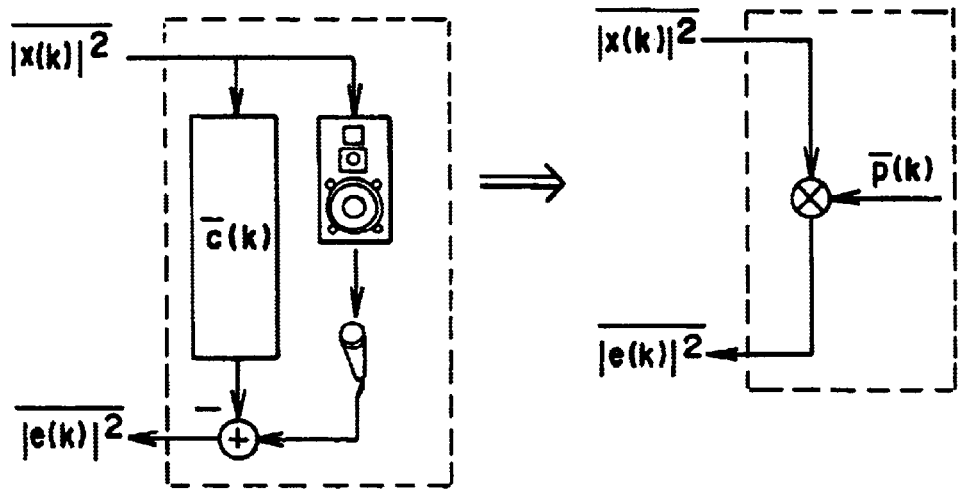
FIG. 6 shows a model presentation for the power transmission factors.

The adaptation of the subband echo cancellers is carried out by means of an NLMS method adapted to the signal processor used. A structural illustration of the adaptation process is reproduced in FIG. 5 in order to explain the notation of the following description.

The estimated microphone signals $$\underline{\hat{y}}_\mu^{(r)}(k_r)$$

are formed by convolution of the estimated subband pulse responses with the subband excitation signals of the remote subscriber:

$$\underline{\hat{y}}_\mu^{(r)}(k_r) = \underline{\chi}_\mu^{(r)}(k_r) \cdot \underline{c}_\mu^{(r)}(k_r) \quad (3.1)$$
$$= \underline{\overline{\chi}}_\mu^{(r)H}(k_r)\underline{\overline{c}}_\mu^{(r)}(k_r)$$

The index $\mu$ is intended here to indicate the subband number. The adaptation error $$\underline{e}_\mu^{(r)}(k_r)$$

is calculated by forming the difference between the estimated and the measured microphone signals:

$$\underline{e}_\mu^{(r)}(k_r) = \underline{y}_\mu^{(r)}(k_r) - \underline{\hat{y}}_\mu^{(r)}(k_r) \quad (3.2)$$

This error is composed of a so-called undisturbed error $$\underline{\epsilon}_\mu^{(r)}(k_r)$$

and the component caused by the local talker $$\underline{n}_\mu^{(r)}(k_r):$$

$$\underline{e}_\mu^{(r)}(k_r) = \underline{\epsilon}_\mu^{(r)}(k_r) + \underline{n}_\mu^{(r)}(k_r). \quad (3.3)$$

The adaptation is performed by means of an approximation of the NLMS algorithm $$\underline{\overline{c}}_\mu^{(r)}(k_r+1) = \underline{\overline{c}}_\mu^{(r)}(k_r) + F\left(\alpha_\mu^{(r)}(k_r)\frac{\underline{\overline{\chi}}_\mu^{(r)}(k_r)\underline{e}_\mu^{(r)'}(k_r)}{\underline{\overline{\chi}}_\mu^{(r)H}(k_r)\underline{\overline{\chi}}_\mu^{(r)}(k_r)}\right), \quad (3.4)$$

F(x) denoting the approximation function already mentioned.

The coefficients of the subband echo cancellers are constantly adapted to the subband pulse responses of the LRM system during operation of the hands-free telephone by using the adaptation methods. It is possible thereby to achieve a reduction in the acoustic echo even after system changes. The setting criterion for the adaptation method used is the minimization of the mean square error. In accordance with the calculation specification of the NLMS algorithm, the coefficients experience a substantial change when the samples of the cancelled signal $$\underline{e}_\mu^{(r)}(k_r)$$

of the $\mu$th subband are large. Permanently large values $$\underline{e}_\mu^{(r)}(k_r)$$

can be traced back to two causes:
1. The adaptive filters are poorly adapted to the spatial pulse response after changes in the LRM system. There is then no reduction in the acoustic echoes, or only a very slight one—the uncompensated echo components effect an enlargement of the signals $$\underline{e}_\mu^{(r)}(k_r).$$

The cancellers should be adapted as quickly as possible in such situations.
2. Increasing the local component n(k)—for example in the case of activity of the local talker—likewise enlarges the signals $$\underline{e}_\mu^{(r)}(k_r).$$

For the hands-free telephone, this component is the useful signal to be transmitted, whereas for the adaptive filter it constitutes interference which can lead to false setting of the coefficients. In such situations, the cancellers should not be adjusted, or be adjusted only slightly, so that the compensation already achieved is not worsened again.

A step-size control has already been presented which takes account of the two call situations and/or states of the cancellers described, and which fulfils the requirements placed on the adaptation control. Step size in the nth subband should be set in accordance with $$\alpha_\mu^{(r)}(k_r) = \frac{E\{|e_\mu^{(r)}(k_r)|^2\}}{E\{|\underline{e}_\mu^{(r)}(k_r)|^2\}} \qquad (3.5)$$

The disturbed error signal $$\underline{e}_\mu^{(r)}(k_r)$$

in the denominator of equation 3.5 can be measured directly—the expectation value thereof can be estimated by means of $$E\{|\underline{e}_\mu^{(r)}(k_r)|^2\} \simeq \overline{|\underline{e}_\mu^{(r)}(k_r-1)|^2}. \qquad (3.6)$$

The right-hand side of the approximation 3.6 is intended in this case to denote a recursive first-order smoothing:

$$\overline{|\underline{e}_\mu^{(r)}(k_r)|^2} = \beta_e |\underline{e}_\mu^{(r)}(k_r)|^2 + (1-\beta_e)\overline{|\underline{e}_\mu^{(r)}(k_r-1)|^2}. \qquad (3.7)$$

A power transmission factor $$\overline{p}_\mu^{(r)}(k_r)$$

is introduced for estimating the numerator. In this case, the parallel circuit of LRM system and echo canceller including the subtraction point is modelled to a first approximation as a simple attenuator.

The magnitude of this attenuation (ratio of excitation power to error power) is estimated by the power transmission factor in the subband $$\overline{p}_\mu^{(r)}(k_r) = \frac{|e_\mu^{(r)}(k_r)|^2}{|\underline{\chi}_\mu^{(r)}(k_r)|^2} \text{ where } k_r \in K_{ES,FT} \qquad (3.8)$$

The model assumes in this case that there are no additional interference signals—such as activity of the local talker, for example—in the LRM system. The set $K_{ES,FT}$ was introduced in equation 3.8 for this reason. This set is intended to contain the instants at which a hands-free telephone is in the state of simplex of the remote subscriber.

The smoothed quadratic excitation signal used in equation 3.8 is determined in this case by analogy with the estimated error power:

$$\overline{|\underline{x}_\mu^{(r)}(k_r)|^2} = \beta_2|\underline{\chi}_\mu^{(r)}(k_r)|^2 + (1-\beta_x)\overline{|x_\mu^{(r)}(k_r-1)|^2} \qquad (3.9)$$

In states without spatial change, the power transmission factor will change only very slowly by comparison with the (short-term) excitation powers. In order to improve the variance of the above estimate, it is possible thereby to make use of recursive smoothings with large time constants. The designation large is to be recorded in this case in relation to the time constants in the case of the power estimates.

The estimate of the residual echo is strongly disturbed in the case of activity of the local subscriber. In such cases, the renewal of the estimate of the power transmission factor should not be undertaken—the $$\overline{p}_\mu^{(r)}(k_r)$$

last calculated are retained. Spatial changes in the case of activity of the local talker cannot be detected by this measure. Only after the simplex state of the remote subscriber has been achieved anew are the power transmission factors adapted in such cases. The defining equation for the smoothed power transmission factors can therefore be specified in accordance with $$\overline{p}_\mu^{(r)}(k_r) = \begin{cases} \beta_p \overline{p}_\mu^{(r)}(k_r) + (1-\beta_p)\overline{p}_\mu^{(r)}(k_r-1) & \text{for } k_r \in K_{ES,FT} \\ \overline{p}_\mu^{(r)}(k_r-1) & \text{otherwise} \end{cases} \qquad (3.10)$$

The step sizes $$\alpha_\mu^{(r)}(k_r)$$

can be approximated as follows:

$$\alpha_\mu^{(r)}(k_r) \simeq \frac{\overline{|\underline{\chi}_\mu^{(r)}(k_r)|^2}\,\overline{p}_\mu^{(r)}(k_r)}{\overline{|e_\mu^{(r)}(k_r)|^2}} \qquad (3.11)$$

It follows from the considerations so far that the determination of the power transmission factors can be subdivided into two parts. On the one hand, it is necessary to find an effective calculation of the two power estimates and of the divisions of these two variables on the hardware available. On the other hand, the instants which are contained in the set $K_{ES,FT}$ must be detected.

Non-linear, recursive smoothings are used for the first partial problem. The sum of the absolute value of the real part and the absolute value of the imaginary part of the subband signals is selected as input signals of these filters. The power factors are calculated logarithmically in order to avoid division—the division can therefore be replaced by a subtraction.

A so-called correlation measure $\xi(\kappa_r)$ is used for the second partial problem. A normalized cross-correlation analysis of the excitation signal of the remote subscriber and the microphone signal is carried out in this case. In the case of simplex of the remote subscriber, the two signals are strongly correlated, and the correlation measure delivers values $\xi(\kappa_r) \approx 1$. In the case of activity of the local call participant, the correlation is reduced, and values $\xi(\kappa_r) < 1$ are detected.

Figure 7:
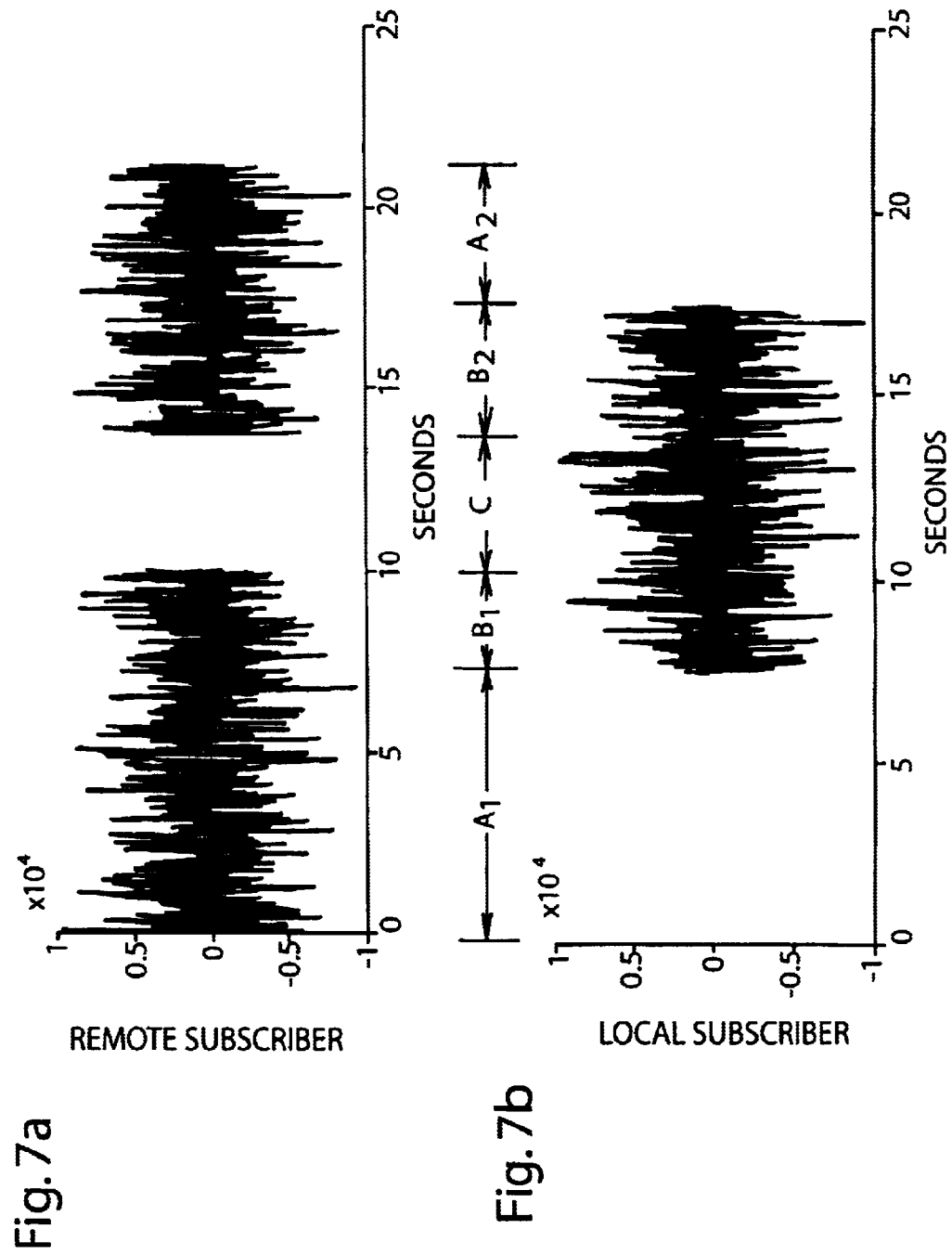
FIG. 7 shows an illustration of the signals of the remote and the local subscriber with the aid of which the method according to the invention is explained below.

The control with the aid of the input signals, illustrated in FIG. 7, of the remote and local call participants was tested in order to illustrate the considerations following here.

In the activity phases, white noise with a Gaussian distribution was selected for both signals. "Simplex" of the remote subscriber was present at the start of the sequence (phase $A_1$). The adaptive echo cancellers can compensate in this phase and reach their final compensation after approximately 3 to 4 seconds. After 7.5 seconds, the local subscriber starts to interrupt the remote one (duplex, region $B_1$) and then adopts the role of the "sole talker" (region C). The situation is reversed after 10.75 seconds. The remote subscriber interrupts the local one (duplex, region $B_2$) and finally continues to "speak" alone (phase $A_2$)

The microphone signal is formed by convolution of the excitation signal with the already presented pulse response of an office room (length of 2044 coefficients at a sampling rate of 8 kHz) and subsequent addition of the signal of the local talker.

Figure 8:
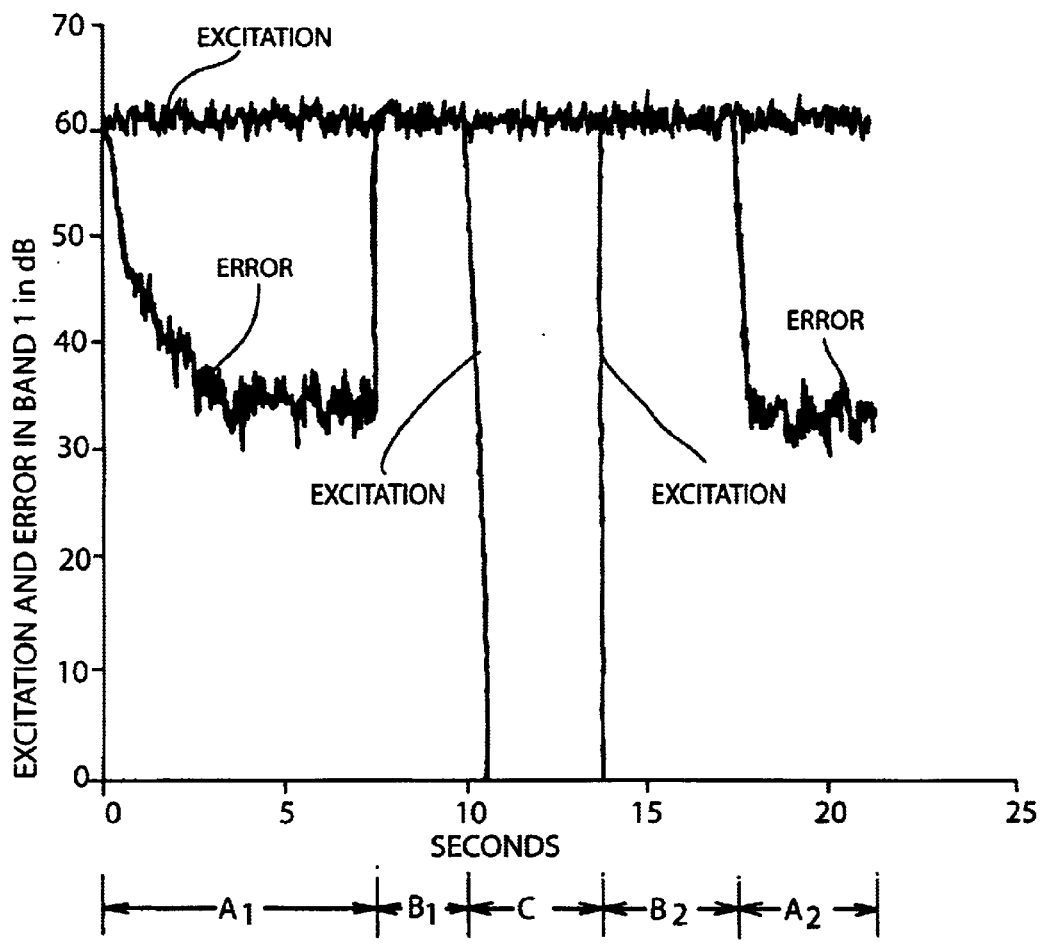
FIG. 8 shows the excitation resulting therefrom, and the disturbed error in band 1.

The mean powers of the excitation and error signals are illustrated in FIG. 8. The adaptation was carried out with the aid of the step size control described below, it being assumed that the correlation evaluations deliver cleardowns only in the regions $A_1$ and $A_2$. It is clearly to be seen in the illustration that the compensation achieved in the course of phase $A_1$ of approximately 25 dB can be held over the regions of the duplex and simplex of the local subscriber.

In accordance with equation 3.8, the mean powers of the excitation signal and of the undisturbed error signal must be estimated in order to determine the power transmission factor in the $\mu$th subband. In the case of direct execution of the smoothing as proposed in equation 3.7 and in equation 3.9, it would be necessary to calculate the double-word accuracy (32 bits) in order to avoid the problem of limit cycles. In order to reduce the memory requirement associated therewith and to reduce the required computing power, only absolute-value smoothings are carried out:

$$\overline{|x_\mu^{(r)}(k_r)|} = \beta_x |x_\mu^{(r)}(k_r)| + (1-\beta_x)\overline{|x_\mu^{(r)}(k_r-1)|} \quad (3.12)$$

$$\overline{|e_\mu^{(r)}(k_r-1)|} = \beta_\mu |e_\mu^{(r)}(k_r)| + (1-\beta_e)\overline{|e_\mu^{(r)}(k_r-1)|} \quad (3.13)$$

Two different time constants ($\beta_{er}$ and $\beta_{ef}$) for rising and falling edges were introduced in the smoothing of the error signal so that the critical case of the activity of the local subscriber in the case of duplex can be detected as quickly as possible. Time constant $\beta_e$ is formed in accordance with $$\beta_e = \begin{cases} \beta_{er} & \text{if } |e_\mu^{(r)}(k_r)| > \overline{|e_\mu^{(r)}(k_r-1)|} \\ \beta_{ef} & \text{otherwise} \end{cases} \quad (3.14)$$

where $0 < \beta_{er} < \beta_{ef} < 1$

The estimate thus obtained loses its unbiasedness through the selection of two different time constants. For this reason, correction factors are introduced in the prior art. A different approach is to be adopted here. The estimate of the excitation power is performed with the same time constants as the estimate of the error power:

$$\beta_x = \begin{cases} \beta_{xr} & \text{if } |x_\mu^{(r)}(k_r)| > \overline{|x_\mu^{(r)}(k_r-1)|} \\ \beta_{xf} & \text{otherwise} \end{cases} \quad (3.15)$$

where $\beta_{xr} = \beta_{er}$ and $\beta_{xf} = \beta_{ef}$.

The correction factor can be dispensed with by the subsequent division of the two variables. Formations of absolute value were approximated by the estimates $$|x_\mu^{(r)}(k_r)| = |\text{Re}\{x_\mu^{(r)}(k_r)\}| + |\text{Im}\{x_\mu^{(r)}(k_r)\}| \quad (3.16)$$

$$|e_\mu^{(r)}(k_r)| = |\text{Re}\{e_\mu^{(r)}(k_r)\}| + |\text{Im}\{e_\mu^{(r)}(k_r)\}| \quad (3.17)$$

which are more favourable in terms of outlay. Here, as well, a correction term can be omitted owing to the division formation. As already mentioned in the previous section, the power transmission factors are determined only logarithmically—the division is thereby reduced to two logarithmations and one subtraction. The power transmission factors are therefore estimated in accordance with $$p_{\mu,\log}^{(r)}(k_r) = \text{LOG}\{\overline{|e_\mu^{(r)}(k_r)|}\} - \text{LOG}\{\overline{|x_\mu^{(r)}(k_r)|}\} \quad (3.18)$$

and $$\overline{p_{\mu,\log}^{(r)}(k_r)} = \begin{cases} \beta_P p_{\mu,\log}^{(r)}(k_r) + (1-\beta_P)\overline{p_{\mu,\log}^{(r)}(k_r-1)} & \text{for } k_r \in K_{ES.FT} \\ \overline{p_{\mu,\log}^{(r)}(k_r-1)} & \text{otherwise} \end{cases} \quad (3.19)$$

The logarithmation is denoted in this case by LOG { ... }. The time constant $\beta_p$ was likewise selected differently for rising and falling edges. The aim thereby is to do justice to the non-cancellable part of the system run time (artificial delay of the microphone signal). Because of this run time, the signal power of the excitation signal drops earlier than that of the error signal—without correction of this process, the estimation would carry out a reduction in the estimated value after each excitation phase. In addition, the time constants are increased upon detection of duplex. The duplex detector used is described further below. The defining equation for the time constant $\beta_p$ is:

$$B_P = \begin{cases} \beta_{pr,ES} & \text{if } |\underline{p}_\mu^{(r)}(k_p)| > \overline{|p^{(r)}(k_r-1)|} \text{ and } k_p \notin K_{GS} \\ \beta_{pr,GS} & \text{if } |\underline{p}_\mu^{(r)}(k_p)| > \overline{|p^{(r)}(k_r-1)|} \text{ and } k_p \in K_{GS} \\ \beta_{pf,ES} & \text{if } |\underline{p}_\mu^{(P)}(k_p)| \leq \overline{|p^{(r)}(k_p-1)|} \text{ and } k_P \notin K_{GS} \\ \beta_{pf,GS} & \text{otherwise} \end{cases} \quad (3.20)$$

where $0 < \beta_{pr,GS} < \beta_{pf,GS} < 1$ and $0 < \beta_{pr,ES} < \beta_{pf,ES} < 1$.

$K_{GS}$ is intended in this case to denote the instants at which the above-described detector detects duplex. The set $K_{ES,FT}$ denotes the instants at which the correlation measure detects simplex of the remote subscriber.

Comparisons between these approximations and the exact calculation according to equation 3.10 delivered deviations in the case of noise excitation of less than 2 dB. This suffices for use within the step-size control, and so this method of estimation was used for the power transfer factor.

Figure 9:
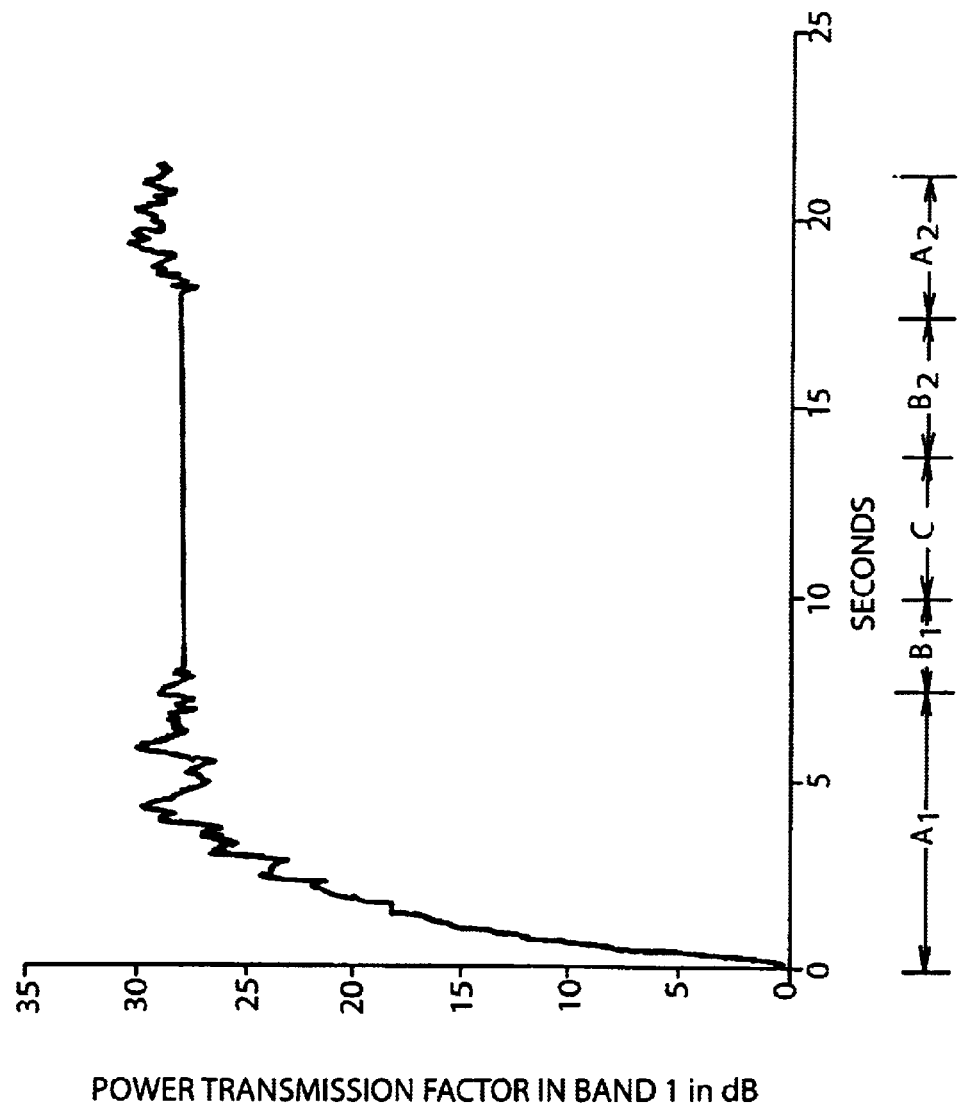
FIG. 9 shows the estimated power transmission factor under the conditions in accordance with FIGS. 7 and 8 in band 1.

The estimated power transfer factor in the first band $$\overline{p_{l,\log}^{(r)}(k_r)}$$

is illustrated in FIG. 9. Its estimation is not renewed in the regions $B_1$, C and $B_2$, since no cleardowns are delivered here by the correlation measure. By comparison with FIG. 8, a good agreement between the desired and estimated values is to be seen. The power difference between excitation and error is to be seen in this case as the desired value. Both the characteristic and the final value, to be seen in FIG. 8, of approximately 26–30 dB are well simulated in the estimate.

The step sizes $\alpha_\mu^{(r)}(k_r)$ in the individual bands can be determined from the previously calculated variables in accordance with $$\alpha_\mu^{(r)}(k_r) = \begin{cases} \hat{\alpha}_\mu^{(r)}(k_r), & \text{if } |x_\mu^{(r)}(k_r)| > |x|_{\min,\mu} \\ 0, & \text{otherwise} \end{cases} \quad (3.21)$$

where $$\hat{\alpha}_\mu^{(r)}(k_r) = LIN\{\text{LOG}\{\overline{|x_\mu^{(r)}(k_r)|}\} + p_{\mu,\log}^{(r)}(k_r) - \text{LOG}\{\overline{|e_\mu^{(r)}(k_p)|}\}\} \quad (3.22)$$

Here, LIN $\{\ldots\}$ denotes the linearization. If the excitation power undershoots a limit $|X|_{min,\mu}$, it is assumed that the excitation exists only as background noise, and the adaptation is halted.

Figure 10:
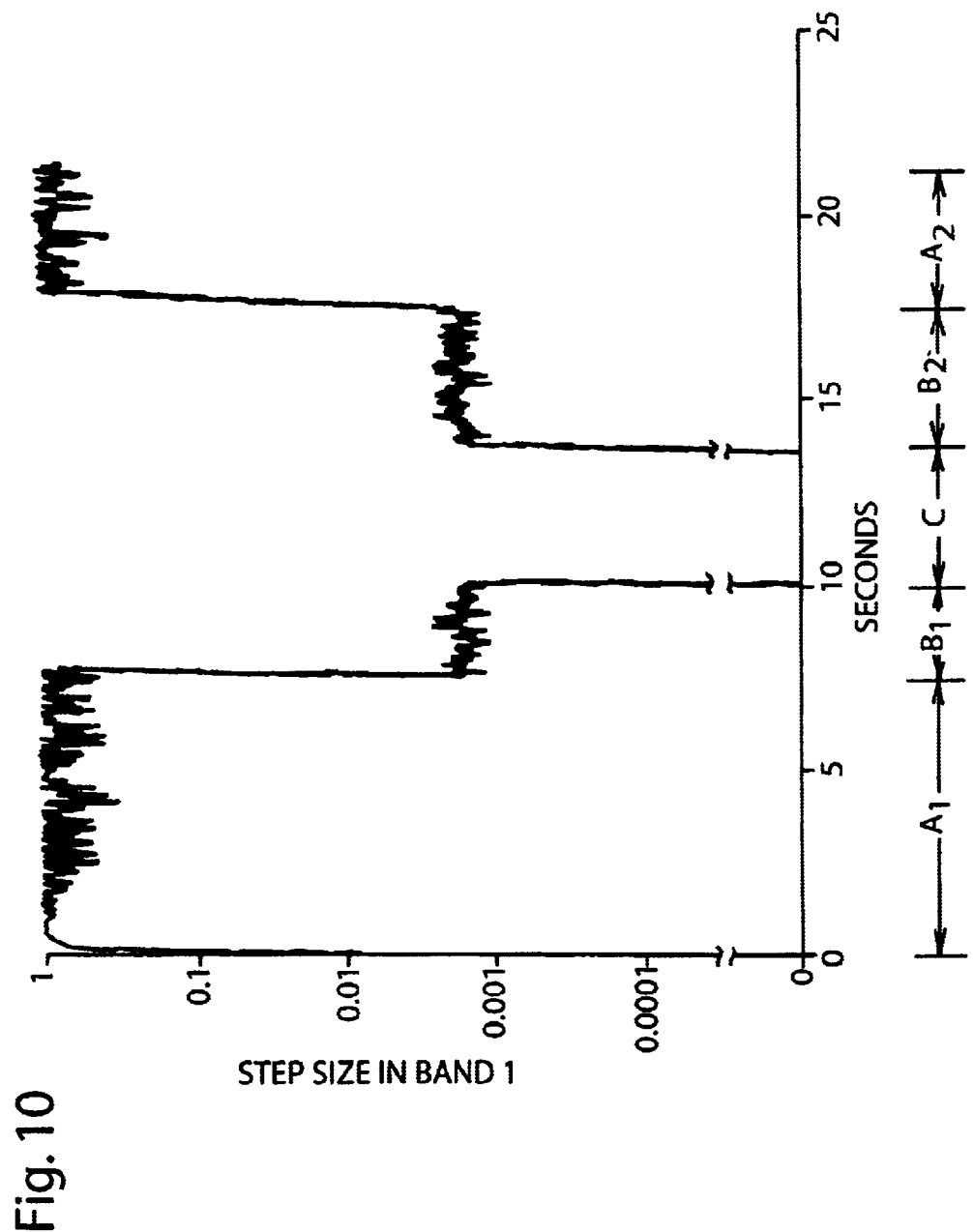
FIG. 10 shows the step size, selected by the step-size controller in band 1 under the conditions in accordance with FIGS. 7 and 8.

The step size in the first subband is illustrated logarithmically in FIG. 10. In phases of simplex of the remote subscriber ($A_1$ and $A_2$), the step size is approximately 1—in phases of the simplex of the local subscriber ($B_1$ and $B_2$) it is possible to determine from FIG. 8 a difference from disturbed to undisturbed error power from approximately 26 to 30 dB. Accordingly, the step size is in the expected region (approximately −27 dB) in the duplex phases, as well.

An estimate of the power transmission factor is required for the step size control presented above. This estimation should be renewed only in the case of simplex of the remote subscriber. For this reason, the set $K_{ES,FT}$ was introduced in equation 3.19, its function being to include the instants at which the desired simplex is present. Because of the strong recursive smoothing, short term false decisions in the selection of the instants do not lead to large erroneous estimates of the transmission factors.

The target detector should be able to decide between simplex and duplex independently of spatial changes and also independently of the power of the input signals. Use is made of a correlation measure—a detector—which fulfils the above requirements. In this case, the cross correlation between the loudspeaker signal and the microphone signal is evaluated in a normalized form.

For the evaluation, the two signals with estimation windows (square-wave functions) of length $L_1$ are multiplied. The final signal strings thus obtained are evaluated in accordance with $$\hat{\xi}(k) = \frac{\left|\sum_{n=0}^{L_1-1} x(k-n)y(k-n)\right|}{\sum_{n=0}^{L_2-1} |x(k-n)y(k-n)|} \quad (3.23)$$

In the case of strongly correlated signals, a maximum in the above-described evaluation occurs when the estimation windows are displaced relative to one another precisely by the propagation time of the LRM system. Since this propagation time is unknown and also variable (for example by displacement of the loudspeaker or the microphone), the maximum of a sequence of $L_2$ evaluations is further processed. The individual evaluations then use an excitation signal x(k−1) delayed by 1 clock pulses. The defining equation is then expanded to:

$$\tilde{\xi}(k) = \text{Max}\{\hat{\xi}(k,l)\} \quad (3.24)$$

$$= \text{Max}\left\{\frac{\left|\sum_{n=0}^{L_1-1} x(k-n-l)y(k-n)\right|}{\sum_{n=0}^{L_2-1} |x(k-n-l)y(k-n)|}\right\}$$

where $l \in \{0 \ldots L_2 - 1\}$.

The numerator and denominator of the above equation must be evaluated in this case with double-word accuracy (32 bits). The individual correlation measures $$\tilde{\xi}(k, l)$$

are calculated recursively in order to reduce the computational outlay:

$$\hat{\xi}(k,l) = \frac{|Z(k,l)|}{N(k,l)} \quad (3.25)$$

$$= \frac{|Z(k-1,l) + x(k-l)y(k) - x(k-l-L_1+1)y(k-L_1+1)|}{N(k-1,l) + |x(k-l)y(k)| - |x(k-l-L_1+1)y(k-L_1+1)|}$$

A cleardown is set whenever the maximum of the determined correlation measures is greater than a limiting value $\xi_0$. The limiting value $\xi_0$ is approximated by a finite sum of non-positive powers of two $$\xi_0 \approx \sum_{x=0}^{N_l} \alpha_n 2^{-2} \quad (3.26)$$

where $\alpha_n \in \{0, 1\}$ in order to avoid a division of two 32-bit values. The threshold value comparison can then be reduced to a summation of right-displaced numerator values and a comparison:

$$\sum_{m=0}^{N\xi} \alpha_n 2^{-a} N(k,l) <> Z(k,l). \quad (3.27)$$

In order to reduce the computational outlay further, the evaluations were carried out only in the most powerful, first subband, and there also only with the real parts of the complex signals. The largest signal-to-noise ratio is to be expected in this band in the case of voice excitation and this should improve the reliability of the detector results. With the aid of this measure, the calculations are carried out only every r sampling clock pulses owing to the undersampling. The instant $k_r$ is then accepted into the set $K_{ES,FT}$ if one of the $L_2$ comparisons yields a correlation measure greater than $\xi_0$.

In accordance with the ITU recommendation G. 167, the return loss to be delivered by the hands-free telephone can be reduced by 15 dB in duplex situations. A duplex detector was developed in accordance with the following considerations for this reason. At the same time, this detector can be used for the purpose of setting the estimates in the step-size control "more carefully" when duplex occurs.

The detection of duplex is carried out in two steps. It is checked in a first step whether the remote talker is active. For this purpose, the excitation signal, smoothed in terms of absolute value, of the remote subscriber is compared with a threshold $|x|_1$, on the one hand, while it is checked, on the other hand, whether the level discriminator algorithm has detected excitation of the remote subscriber. The second comparison is always necessary when the level discriminator introduces large attenuation values (for example after spatial changes). The receiving path can be strongly damped in such situations. Here, the comparison with the smoothed input signal would not yield a reliable result. Excitation of the remote subscriber ($A_{fe}=1$) is therefore always adopted when either the power comparison or the level discriminator detector (variable SR=1) detect the following:

$$A_{fe} = \begin{cases} 1, & \text{if } \overline{|x(k)|} > |x|_l \text{ or } SR = 1 \\ 0, & \text{otherwise} \end{cases} \quad (3.28)$$

The excitation signal smoothed in terms of absolute value is calculated in this case in a fashion similar to the recursive, non-linear smoothings described in the step-size control. However, it is to be borne in mind here that it is necessary because of the higher sampling rate to use larger time constants, and this can lead to the occurrence of limit cycles. A calculation with double-word accuracy (32 bits) is therefore required:

$$\overline{|x(k)|} = \beta_{xg}|x(k-N)| + (1-\beta_{xg})\overline{|x(k-1)|} \quad (3.29)$$

The time constant $\beta_{xg}$ is selected as follows in this case:

$$\beta_{xg} = \begin{cases} \beta_{xgr}, & \text{if } |\chi(k-N)| > \overline{|\chi(k-1)|} \\ \beta_{xgf}, & \text{otherwise} \end{cases} \quad (3.30)$$

where $0 < \beta_{xg} < \beta_{xgr} < 1$.

The delay of N clock pulses was introduced in order to compensate the propagation time of the analysis/synthesis system again during the comparisons in the second detector stage. This does not require any additional memory, since the analysis filter stores the last N signal values of the input signal in any case.

In a second stage, it is established whether the local call participant is also active. For this purpose, a comparison is carried out between the performance of the estimated, undisturbed error and the measurable, disturbed error. The power estimates are reduced again to absolute-value smoothings and the determination of a power transfer factor. The smoothing of the error signal is carried out in accordance with $$\overline{|e(k)|} = \beta_g|e(k)| + (1-\beta_{eg})\overline{|e(k-1)|} \quad (3.31)$$

The time constant $\beta_{eg}$ is selected as follows:

$$\beta_{xg} = \begin{cases} \beta_{egr}, & \text{if } |e(k)| > \overline{|e(k-1)|} \\ \beta_{egf}, & \text{otherwise} \end{cases} \quad (3.32)$$

where $\beta_{egr} = \beta_{xgr}$ and $\beta_{egf} = \beta_{xgf}$.

An "overall band" power transfer factor $p_{EK}(k)$ is determined for the estimate of the undisturbed error power:

$$p_{EK}(k) = \text{LOG}\{\overline{|e(k)|}\} - \text{LOG}\{\overline{|x(k)|}\}. \quad (3.33)$$

In order to improve the variance for the estimate, this variable is also recursively smoothed. Since the determination of the transfer factor consists only of smoothed variables, it is carried out only in an undersampled fashion:

$$\overline{p_{ET}^{(r)}(k_r)} = \begin{cases} \beta_{eg}p_{EK}(rk_r) + (1-\beta_{eg})\overline{p_{EK}^{(r)}(k_r-1)} & \text{for } k_p \in K_{EK,FT} \\ \overline{p_{EK}^{(r)}(k_r-1)} & \text{otherwise} \end{cases} \quad (3.34)$$

where $0 < \beta_{eg} < 1$.

In order to detect the excitation of the local subscriber ($A_{lo}=1$), the difference between the measured and the estimated error powers is determined. An additional dependability threshold $p_{GS}$ was introduced in order to avoid a false decision. The detector detects excitation of the local subscriber when the measured error power is greater by at least $p_{GS}$ dB than the error power estimated from the excitation power and the power transmission factor. This comparison is also carried out in an undersampled fashion:

$$A_{lo(r)} = \begin{cases} 1, & \text{if } \text{LOG}\{\overline{|e(rk_r)|}\} - p_{GS} > \text{LOG}\{\overline{|x(rk_r)|}\} + \overline{p_{EK}^{(r)}(k_r)}. \\ 0, & \text{otherwise} \end{cases} \quad (3.35)$$

Figure 11:
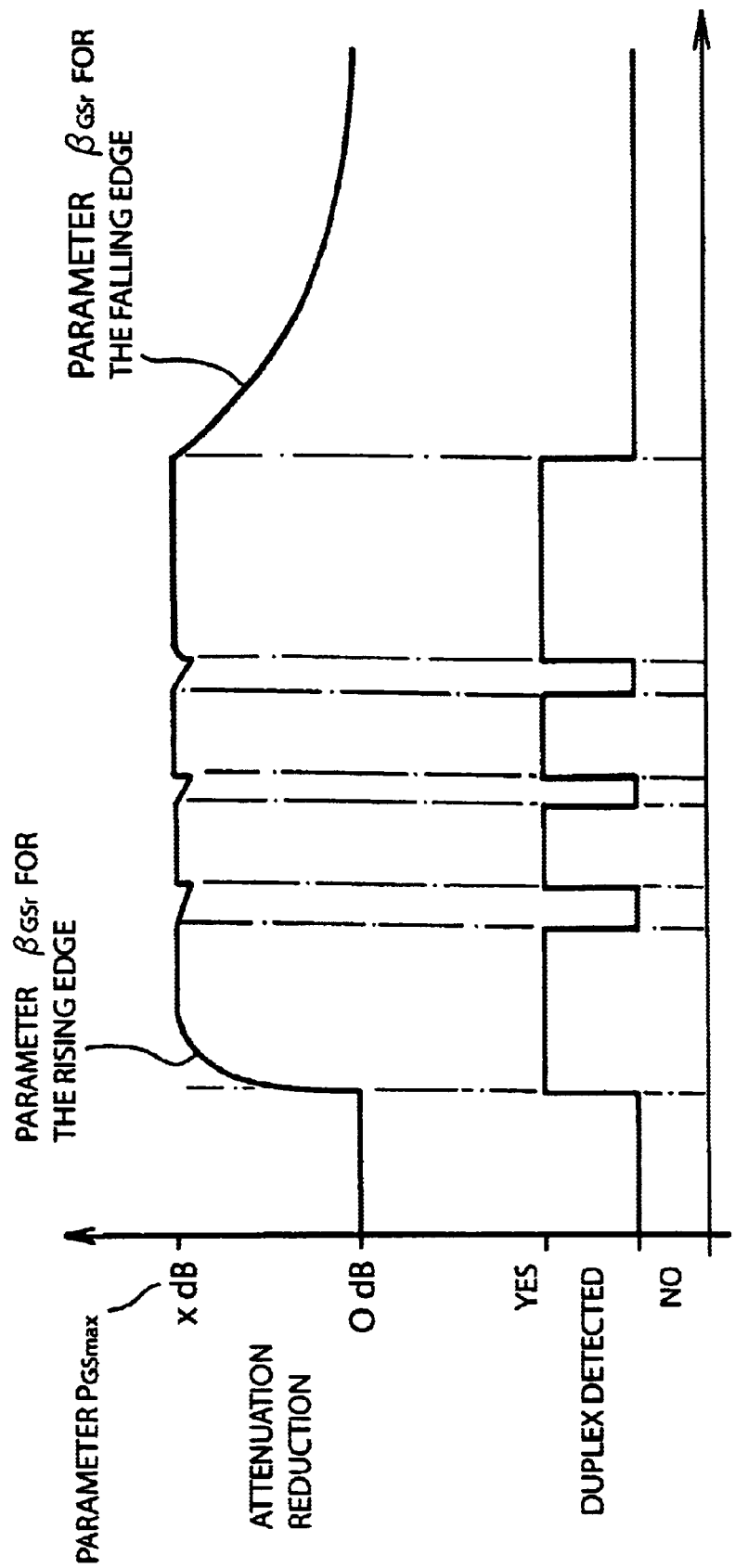
FIG. 11 shows the smoothing according to the invention of the attenuation reduction.

The detector detects duplex when the AND operation on the variables $A_{fe}$ and $A_{lo}$ produces the value of one. In these cases, the residual attenuation introduced by the level discriminator can be reduced by $p_{GSmax}=15$ dB. The reduction in the required attenuation is performed by smoothing using low pass filters. The time constant for the rising edge $\beta_{GSr}$ should be as small as possible, in order not to cut off the beginning of a voice passage. The time constant for the falling edge $\beta_{GSf}$ should be selected to be greater than the rise constant, so that the attenuation reduction $$\overline{p_{GS}^{(f)}(k_r)}$$

is not completely withdrawn in short voice pauses. This relationship is illustrated in FIG. 11. The smoothed attenuation reduction is determined as follows:

$$\overline{p_{GS}^{(r)}(k_r)} = \begin{cases} \beta_{GSr} p_{GSmax} + (1-\beta_{GSr})\overline{p_{GS}^{(r)}(k_r-1)}, & \text{if } A_{fo} - A_{lo} = 1 \\ (1-\beta_{GSr})\overline{p_{GS}^{(r)}(k_r-1)}, & \text{otherwise} \end{cases} \quad (3.36)$$

The instant $k_r$ is accepted into the set $K_{gs}$ if the attenuation reduction is above a predetermined value. An exemplary characteristic of the attenuation reduction is illustrated in FIG. 11.

The overall attenuation of the level discriminator, which is prescribed by the ITU-T recommendation G. 167, can be reduced by the attenuation of the overall system of room and echo canceller. Even in the case when echo cancellation is switched off, the control described estimates the transfer factor of the acoustic link from the loudspeaker to the microphone, including the analogue gains. As a result, it is possible to react to different loudspeaker gains and different (analogue) microphone gains, and to (digitally) adapt the overall attenuation in accordance with the required values. In the duplex case, the overall attenuation can be set to a smaller value, likewise in accordance with the ITU-T recommendation G. 167. A detector and an appropriate transfer variable was also presented or defined for this purpose. The overall attenuation of the level discriminator $D_{PW}(k)$ is therefore controlled (initially without taking account of the post filtering) according to the following method:

$$D_{PW}(k) = D_0 - D_{EK}(K) - D_{GS}(k). \quad (3.37)$$

All variables in the above equation are present in logarithmic form in accordance with the requirements of the ARCOFI level discriminator method. $D_0$ is the required maximum attenuation (for example 45 dB) in this case. The attenuation of the echo canceller $D_{EK}(k)$ is determined by the calculating expression $$D_{EX}(k) = \begin{cases} \overline{p_{EX}^{(r)}\left(\frac{l}{r}\right)} & \text{if } k = ir \quad (3.38) \\ D_{EX}(k-1) & \text{otherwise} \quad (3.39) \end{cases}$$

where $i \in Z$

The duplex reduction $D_{GS}(k)$ can be specified by analogy therewith by $$D_{GS}(k) = \begin{cases} \overline{p_{GS}^{(r)}\left(\frac{k}{r}\right)} & \text{if } k = ir \quad (3.40) \\ D_{EX}(k-1) & \text{otherwise} \quad (3.41) \end{cases}$$

where $i \in Z$

It emerges in the real time implementation of the echo cancelling method that the adaptive filters are never capable of completely removing the component of remote talker from the microphone signal by calculation. There can be many different reasons for this, of which three are advanced here by way of example:
 a) The spatial pulse responses are generally longer than the echo cancellers, as a result of which a residual error remains.
 b) The fixed point arithmetic of the DSP used has a limiting effect on the final compensation of the filters.
 c) In the case of spatial changes, the NLMS algorithm tracks the adaptive filters only at a finite speed—echoes are once again more strongly perceptible until the final compensation is reached once again.

Thus, in addition to the component of the local talker n(k), the error signal e(k) also contains the non-cancelled component of the remote talker, which has already been denoted as "undisturbed" error $\epsilon(k)$ in the preceding parts of this description. For the remote subscriber, the signal n(k) is the useful component of the signal e(k)—the signal $\epsilon(k)$ is the interference, from this point of view.

It is shown below how post filtering of the signal e(k)—to attenuate the "interference" $\epsilon(k)$—can be combined with the step size control for the subband echo cancellers on the basis of a Wiener filter approach. For this purpose, a transverse filter of order M-1 is inserted following the synthesis filtering. In this case, the parameter M is simultaneously the band number of the filter bank. The coefficients are determined in the subband level and transformed into the time domain using an inverse DFT. Owing to the several smoothings, the determination of the coefficients is affected by an inertia, and thus a propagation time. This propagation time can be balanced out again at least partially by the synthesis filtering which is situated between the determination and use of the coefficients and is designed with maximum phase. The post filtering is performed in this case in the time domain and in a frequency-selective fashion.

The derivation returns simple controlled variables with the aid of which the "influence" of the Wiener filter can be controlled as a function of the cancellation power of the adaptive filters. The attenuation inserted by these methods can also be estimated with low outlay, and be "communicated" to the level discriminator.

It will emerge below that the determination of the coefficients of the Wiener filter can be reduced to the calculation of M/2+1 subtractions, a (simplified) inverse Fourier transformation of length M, and a few recursive smoothings. Both the subtractions as well as the inverse FFT and the smoothings are to be carried out in this case only every r samples. The computational outlay is therefore very slight by comparison with the remaining components of the handsfree telephone!

Figure 12:
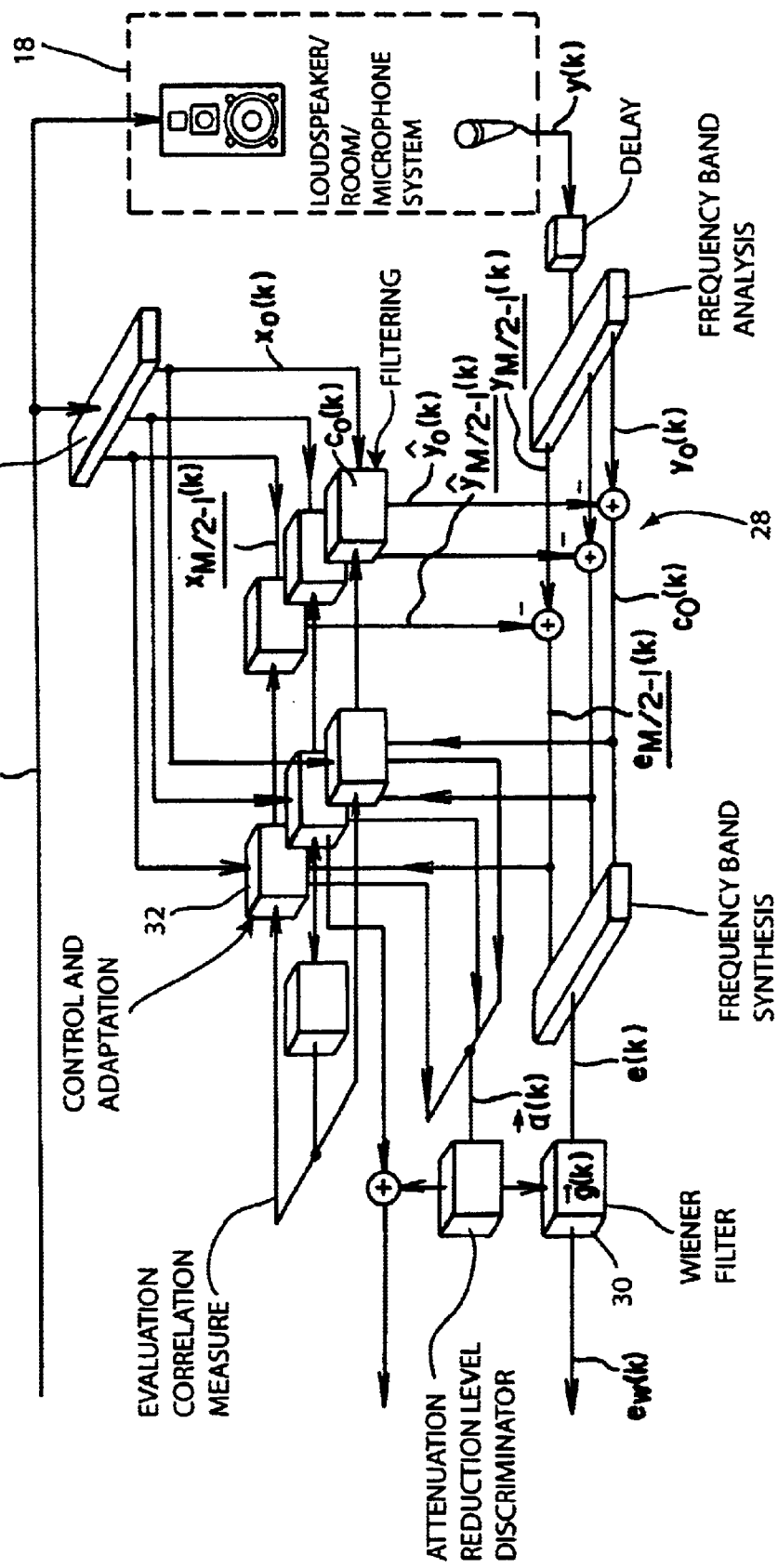
FIG. 12 shows a detailed illustration of the post filtering of the error signals.

In accordance with FIG. 12, the filter $\vec{g}(k)$ 30 is placed downstream of the synthesis. The order of the filter may be M-1, which means that M coefficients must be set. In accordance with the Wiener approach, the filter 30 is to release the "disturbed" signal e(k) optimally from the "interference" $\epsilon(k)$. The frequency response of such a filter is:

$$G_{opt}(\Omega) = \frac{S_{on}(\Omega)}{S_{ol}(\Omega)}$$

It holds for the signal e(k) that:

$$e(k) = \epsilon(k) + n(k).$$

The filter frequency response can therefore be converted to $$G_{opt}(\Omega) = \frac{S_{mn}(\Omega) + S_{mn}(\Omega)}{S_{oc}(\Omega) + S_{Br}(\Omega) + S_{mt}(\Omega) + S_{mn}(\Omega)}$$

The signals of the remote and local subscribers (n(k) and $\epsilon(k)$ respectively) are regarded as being uncorrelated. Furthermore, it is assumed that the signals n(k) and $\epsilon(k)$ are averageless, owing to the high-pass filtering of the line input signal and microphone signal. The frequency response is thereby simplified to:

$$G_{opt}(\Omega) = \frac{S_{mn}(\Omega)}{S_{ES}(\Omega) + S_{mn}(\Omega)}$$
$$= 1 - \frac{S_{ES}(\Omega)}{S_{\mu}(\Omega) + S_{mn}(\Omega)}$$
$$= 1 - \frac{S_{ES}(\Omega)}{S_{GS}(\Omega)}.$$

Since the filter $\vec{g}(k)$ is of order M−1 and is to be determined by inverse Fourier transformation from the frequency response $G_{opt}(\Omega)$, it is necessary to determine M interpolation points of the frequency response. The result for the frequencies $$\Omega_\mu = \mu \frac{2\pi}{M} \text{ where } \mu \in \{0 \ldots M-1\}$$

is:

$$G_{opt}(\Omega_\mu) = 1 - \frac{S_{EC}(\Omega_\mu)}{S_{nt}(\Omega_\mu)}.$$

However, in addition to the interpolation points in the frequency domain, the frequencies $\Omega_\mu$ also simultaneously represent the band centres of the previously described bandpass filters in the case of subband decomposition. Thus, it is possible to have recourse to corresponding variables in the individual subbands when estimating the variable $$\frac{S_{EC}(\Omega_\mu)}{S_{nt}(\Omega_\mu)}.$$

$G_{opt}(\Omega_\mu)$ can be approximated by $$G_{opt}(\Omega_\mu) = 1 - \frac{E\{|e_\mu(k)|^2\}}{E\{|\underline{e}_\mu(k)|^2\}}$$

Since stationality of the input signals was presupposed in deriving the Wiener filter, whereas this can be assumed only for short passages in the case of voice, the power density spectra should be replaced by corresponding short term estimated power values in the respective frequency domain. The same preconditions therefore hold for estimating the quotients $$\frac{S_{TC}\left(\mu \frac{2x}{M}, k\right)}{S_{GS}\left(\mu \frac{2x}{M}, k\right)} \text{ where } \mu \in \{0 \ldots M-1\}$$

as for the estimation of the step sizes in the respective bands. The DFT transform of the filter $\vec{g}(k)$ could therefore be determined using $$\overline{G}^{(r)}(k) = 1 - \overline{\alpha}^{(r)}(k)$$

The superscripted "(r)"s are intended in this case to refer to the undersampling level. $\overline{\overline{G}}^{(r)}(k)$ and $\overline{\overline{\alpha}}_1^{(r)}(k)$ therefore vary only every r sampling steps. In the preferred exemplary embodiment, r=13 was selected. It was shown that the complex bands need be calculated only for $$\mu = 1 \ldots \frac{M}{2} - 1$$

—the bands $$\mu = \frac{M}{2} - 1 \ldots M - 1$$

can be determined by complex conjugation. Since the step sizes are, however, real, the vector $\overline{\alpha}^{(r)}(k)$ can be formed as follows:

$$\overline{\alpha}^{(r)}(k) = (\alpha_o^{(r)}(k), \alpha_1^{(r)}(k) \ldots, \alpha_7^{(r)}(k), 1, \alpha_7^{(r)}(k), \ldots, \alpha_1^{(r)}(k))^\tau.$$

Since the subband decomposition filters out the region of the last subband (3750 Hz–4000 Hz in the case of a sampling r ate of 8 kHz), this region is also to be impassable in the wiener filter used, thus resulting in the selection of $G_8^{(r)}(k)=0$ or $\alpha_8^{(r)}(k)=1$.

In the practical application of this method, it is seen that a slightly modified approach leads to better results. By analogy with known methods of noise reduction, the estimated interpolation points of the filter frequency response are time-smoothed, and provided with a so-called overestimation factor β and a maximum attenuation $G_{min}(k)$. The time smoothing is applied to the step sizes and performed using an IIR filter of first order having two different time constants for rising ($\gamma_r$) and falling ($\gamma_f$) edges:

$$\overline{\alpha_\mu^{(r)}}(k) = (1 - y_{r,f})\alpha_\mu^{(r)}(k) + \gamma_{r,f}\overline{\alpha_\mu^{(r)}}(k-1)$$

where $\mu \in \left\{0 \ldots \left(\frac{M}{2} - 1\right)\right\}.$

In the case of linear smoothing ($\gamma_r = \gamma_f$), the attenuation at the start of a voice passage of the remote subscriber would firstly be introduced slowly and then evermore quickly. At the end of the voice passage, the attenuation would then be reduced at first quickly and then evermore slowly. In order to illustrate this relationship, an exemplary characteristic of the term (1−α(k)) in one of the subbands is illustrated in FIG. 13. At the start, there is to be a voice pause of the remote talker, the term (1−α(k)) therefore being equal to one. As the voice passage starts, the step size α(k) may be set to a value close to one—the step size may remain at this value to the end of the voice sequence for the sake of simplicity, and the step size is set to zero again subsequently. In order to illustrate the magnitude of the attenuation inserted (it being assumed, for simplicity, that there is the same characteristic in all bands), the points at which the curve with the smoothed step size reaches the values $$\left(1 - \frac{1}{2}\right), \left(1 - \frac{1}{4}\right)$$

and $$\left(1 - \frac{1}{8}\right)$$

are marked. These values then correspond to an attenuation of 6 dB, 12 dB and 18 dB, respectively. The term $\overline{\alpha}(k)$ smoothed with two different time constants is illustrated in the lower part of FIG. 13. Here, the attenuation is introduced quickly at the start of the voice passage—there is a slower reduction in the introduced attenuation at the end.

The vector $\overline{\alpha}^{(r)}(k)$ used in the implementation is therefore composed of the smoothed step sizes:

$$\overline{\alpha}^{(r)}(k) \approx \left(\overline{\alpha_n^{(r)}}(k), \overline{\alpha_1^{(p)}}(k), \ldots, \overline{\alpha_1^{(r)}}(k), 1, \overline{\alpha_7^{(r)}}(k), \ldots, \overline{\alpha_1^{(p)}}(k)\right)^r.$$

The filter frequency response is then estimated in accordance with $$G_n^{(v)}(k) = \text{Max}\{(1 - \beta\overline{\alpha_a^{(r)}}(k)), G_{mn}(k)\} \quad (4.1)$$

where $n \in \{0 \ldots (M-1)\}$

In the case of a selection greater than one, the overestimation factor β accelerates the introduction of the attenuation, and it enlarges the attenuation. A value of between 1.0 and 3.0 is preferably selected for β.

The estimated spectral values of the filter can be limited below by the parameter; $G_{min}(k)$. If this parameter is selected, for example to be zero, the filter could set the output signal to zero. If $G_{min}(k)=1$ is set, the output signal experiences no change. Thus, the "influence" of the Wiener filter can be controlled using the parameter $G_{min}(k)$. It emerged in real time trials that it is sensible to link the control of this parameter to the compensated state of the echo cancellers. At the start of a compensating operation, the attenuation which is reached by the echo cancellers is still very slight. Here, the Wiener filter should be able to intervene strongly and to introduce large attenuations (for example up to 45 dB in accordance with the ITU recommendations). If strong background noise is present in the room in which the hands-free telephone is located, the Wiener filter certainly suppresses the echoes, but the remote subscriber then perceives a type of modulation of the background noise. The noise is transmitted without attenuation in his voice pauses, and while he is speaking it is subjected to attenuation (for example to a level of 45 dB).

At the start of a compensation operation, such "effects" are tolerable, the more so since "conventional" methods act similarly to the level discriminator. However, this effect should be reduced with increasing compensation of the cancellers. Here, as well, the step size control delivers a suitable controlled variable—the estimated power transfer factor $D_{EK}(k)$. The setting of the parameter $G_{min}(k)$ is therefore performed in accordance with:

$$G_{min}(k) = LIN\{\text{Max}\{0, (G_{max,log} - D_{EK}(k) - D_{GS}(k))\}\}. \quad (4.2)$$

In this case, "LIN" denotes the linearization, already used in the step size control, of logarithmic variables. The maximum insertion loss (for example 45 dB) can be set with the parameter $G_{max,log}$. This fixed value is then reduced by the attenuation $D_{EK}(k)$, which the echo cancellers perform on average, and by the duplex reduction $D_{GS}(k)$. In this case, the variables $D_{EK}(k)$ and $D_{GS}(k)$ are present in the same logarithmic form as the constant $G_{max,log}$. The limitation of the calculated variable to 0 dB serves the purpose of adaptation to the linearization.

As a result, all controlled variables for setting the Wiener filter are determined, as are the filter coefficients in the subband region. The estimated spectral values of the filter thus obtained are transformed into the time domain with the aid of an inverse DFT so as to produce a phase-linear filter. It is possible in this case to make use of the fact that the system function is both real and symmetrical, and the outlay of the IDFT can be reduced to approximately one quarter.

The attenuation $D_w(k)$ of the signal e(k) by the Wiener filter is communicated to the level discriminator via an interface by analogy with the attenuation of the echo cancellers and the attenuation reduction in the case of duplex. The attenuation is approximated in this case by the mean value over all frequency bands to be transmitted:

$$D_w^{(r)}(k) = \text{LOG}\left(\frac{1}{8}\sum_{\mu=0}^{7}(1 - \overline{\alpha_\mu^{(r)}}(k))\right).$$

Here, "LOG" denotes the normalization or logarithmation already used in the step size control. It ensures communication with the level discriminator which is specific in terms of interface. The division by 8 is achieved by 3 bits. Before the attenuation is then finally transferred to the level discriminator, a recursive, non-linear smoothing is performed:

$$\overline{D_w^{(r)}}(k) = \beta_{r,f}\overline{D_w^{(r)}}(k-1) + (1 - \beta_{r,f})D_w^{(r)}(k).$$

The use of different time constants for rising and falling edges has the effect that the estimate is "more cautious". If the Wiener filter inserts attenuation, the level discriminator reduces its attenuation more slowly. The error signal is therefore attenuated in the short term more than the required 45 dB. If the Wiener filter reduces its attenuation, by contrast, the level discriminator very quickly inserts the residual attenuation. The time delay by the synthesis filtering can also lead here to a short term overall attenuation of more than the set upper limit (for example 45 dB).

The simulation described in the section on step size control was repeated for the purpose of illustrating the considerations so far—but this time expanded with the aid of the Wiener filter presented above. The measured spatial pulse response of an office room with a reverberation time of approximately 300 ms was used as spatial pulse response. In accordance with FIG. 14, white noise was fed in both at the remote and at the local subscriber end as excitations.

Figure 15A:
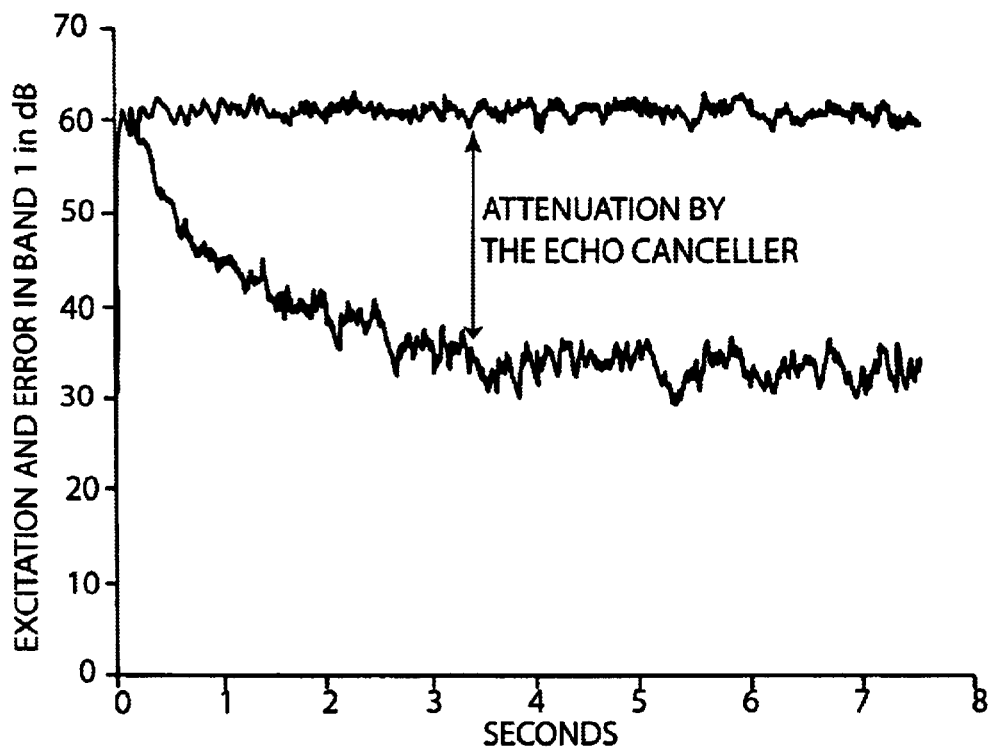
FIG. 15 shows the compensation characteristic and the attenuation by the further filter in band 1.
Figure 15B:
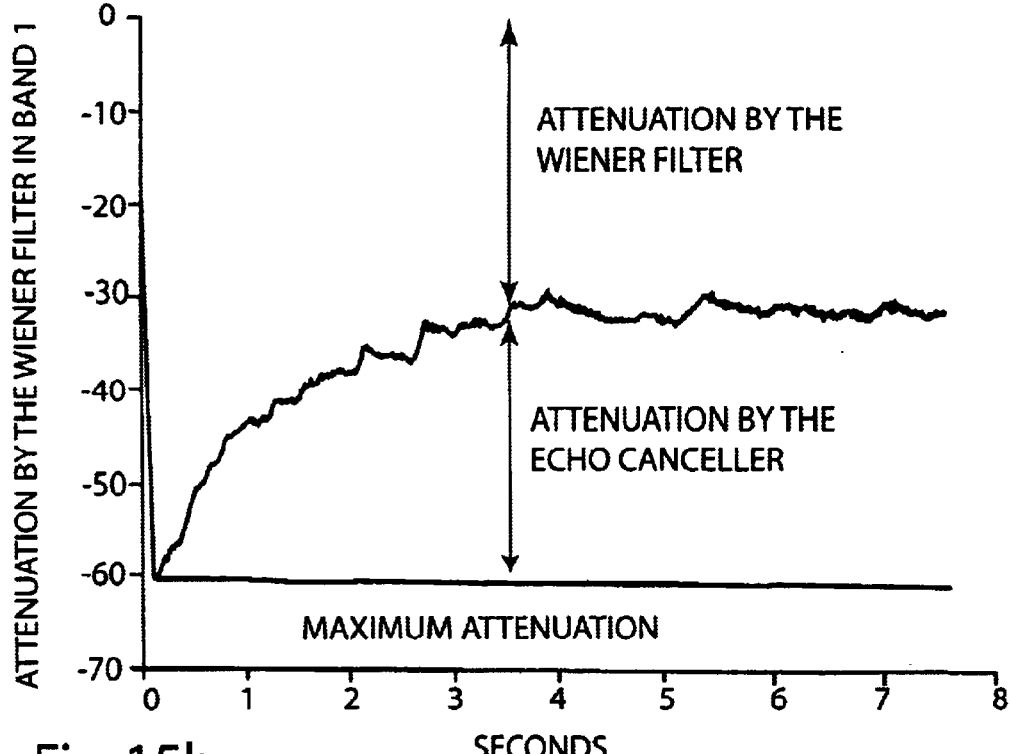
Figure 18:
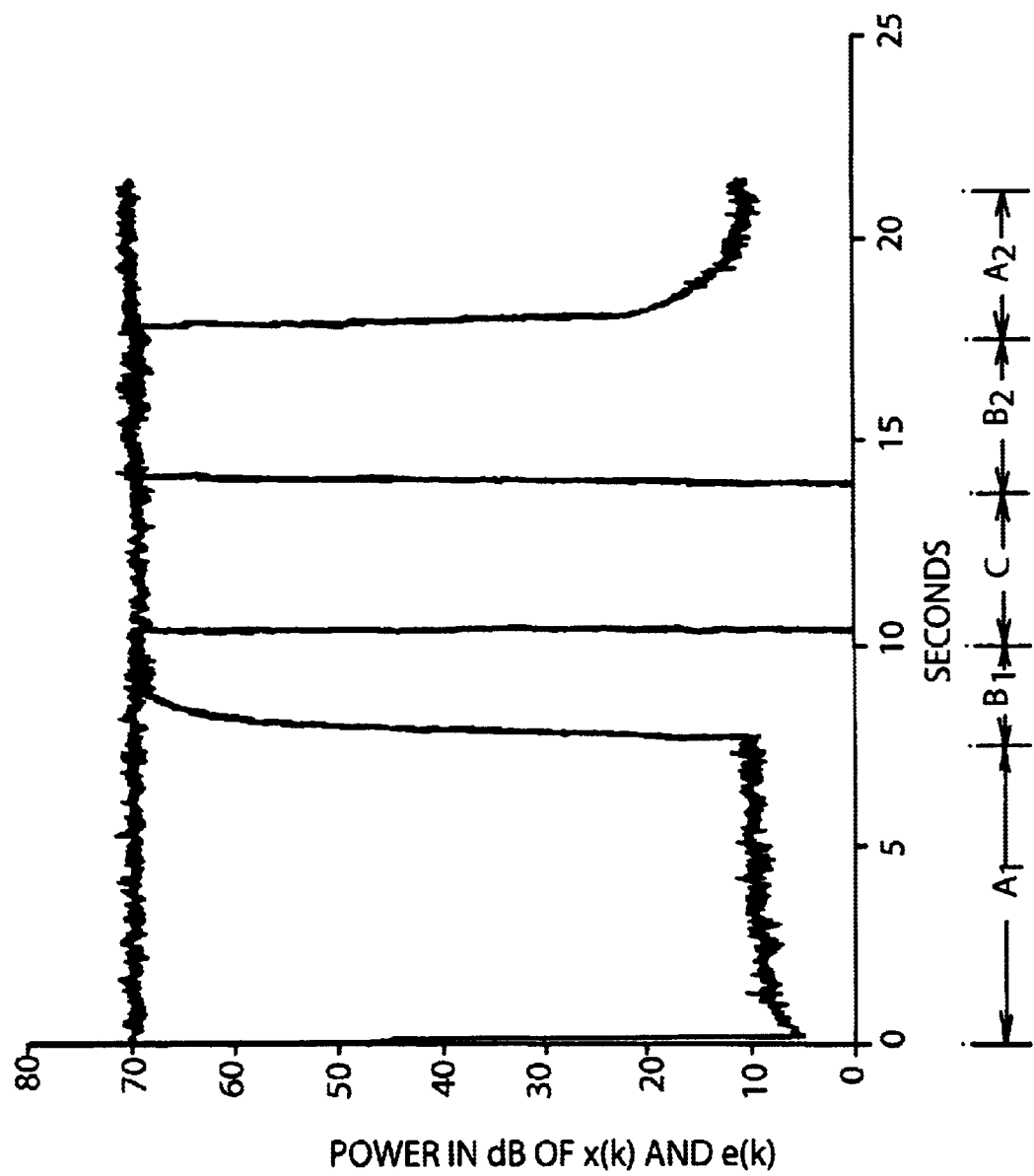
FIG. 18 shows the excitation power and error power in the overall band (in each case for the input signal characteristic in accordance with FIG. 14).

In order to represent the influence of the Wiener filter clearly, the maximum attenuation $G_{max,log}$ was selected at 60 dB. The initial compensating operation of the cancellers takes place in the region $A_1$. At the start of this region, the cancellers are not yet compensated—while at the end the final compensated state is achieved in all bands. Since no duplex takes place in this phase, the Wiener filter should insert the difference between 60 dB and the attenuation which is achieved,by the echo cancellers. For this purpose, FIG. 15 illustrates in the region $A_1$ the coefficient $$G_1^{(p)}(k) = \text{Max}\{(1 - \beta\overline{\alpha_1^{(r)}}(k)), G_{min,1}(k)\}$$

in the subband 1 (250–750 Hz at a sampling rate of 8 kHz) together with the excitation and error signals upstream of the Wiener filter. The transient response of the Wiener filter is firstly to be seen in this case. Owing to the inertia of the low-pass smoothings, the attenuation is not immediately inserted—this effect is partially balanced out again by the transformation into the time domain and the intermediate synthesis filtering. Consequently, at the start of the activity of the remote talker an attenuation of 25 dB is nevertheless already inserted in the overall band signal (see FIG. 18). After approximately 200 ms, the attenuation has then already been increased to its final value of 60 dB. With increasing compensation of the canceller, the attenuation by the Wiener filter in band 1 is reduced and, as expected, reaches a final value of approximately 30 dB (60 dB maximum limitation −30 dB return loss through the canceller). Since the Wiener filter was not inserted until after the synthesis, the characteristics of the excitation, the error, the step size and the power transfer factor in band 1 can be taken from FIGS. 9 and 10.

Consequently, for the case of the simplex of the remote call participant (regions $A_1$ and $A_2$) it is the maximum limit of the attenuation $G_{min}(k)$ to be inserted which is the determining variable. In accordance with the approach of the filter, the overall signal e(k) is to be separated from its interference $\epsilon(k)$. Since the local subscriber—the useful signal in e(k)—is not active, however, the overall signal consists only of the interference. If the limitation were to be omitted in the case of the determination of the coefficients $$G_1^{(r)}(k),$$

these coefficients would be set equal to zero and the interference would thereby be eliminated.

Figure 16:
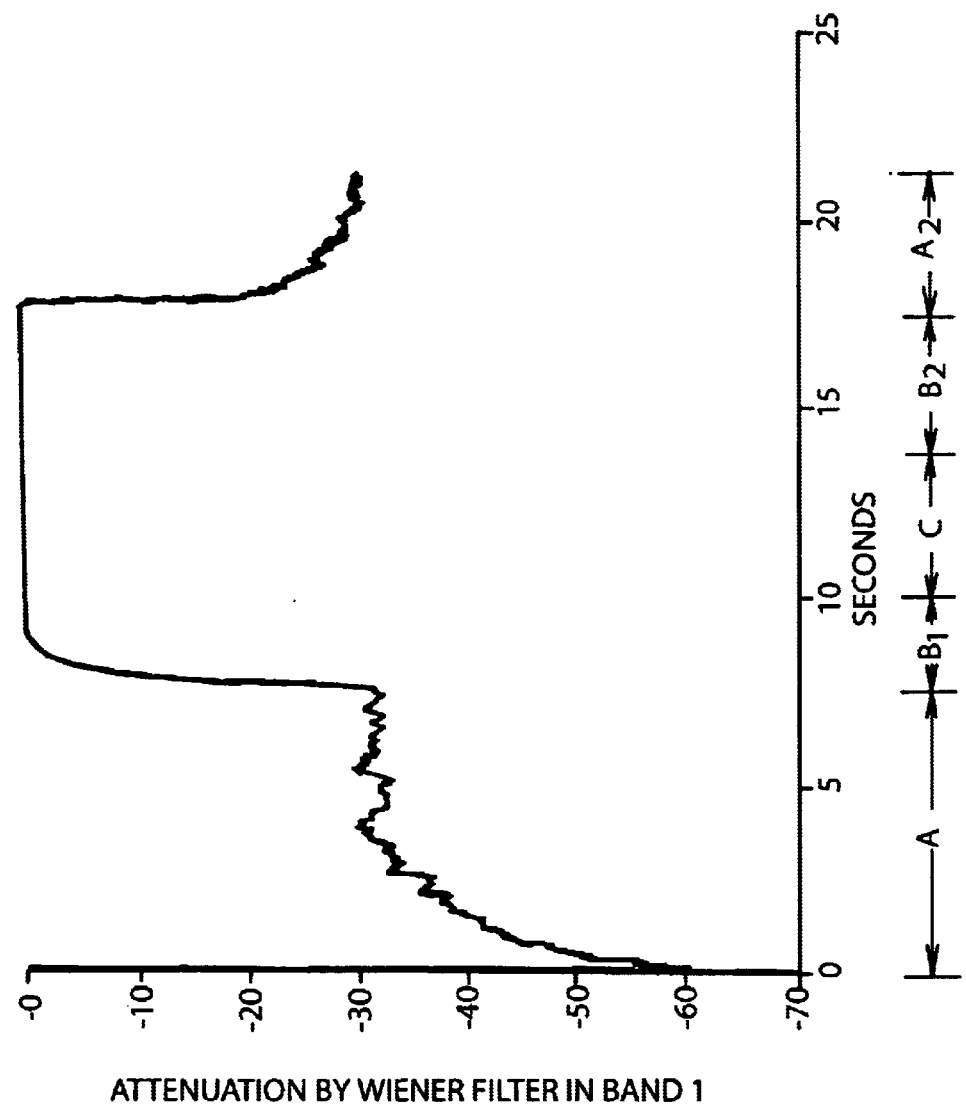
FIG. 16 shows the attenuation by the further filter in band 1.

In order to explain this relationship, FIG. 16 illustrates the attenuation, inserted by the Wiener filter, in band 1. The initial value of approximately 60 dB is determined by the maximum attenuation $G_{max,log}$ set. The cancellers initialized with zero vectors at the start of the simulation perform compensation in the course of phase $A_1$, and thereby reduce the upper limit of the attenuation to be introduced to approximately 30 dB. In the duplex phase $B_1$ now following, this upper limit is reduced once again, by 15 dB, by the duplex detector to now only approximately 15 dB. However, this limit is not reached, because the power of the local talker is far above that of the residual echo. In accordance with the selected setting algorithm, virtually no attenuation is therefore introduced in the duplex phase $B_1$. The determining variable in the duplex phase is the power ratio of the signal of the local talker and the residual echo of the remote talker. The power of the residual echo is a function, on the one hand, of the excitation power of the remote subscriber and, on the other hand, of the compensated state of the cancellers. The better these are compensated, the less will be the influence of the Wiener filter in these passages.

In the following duplex situation C, the local subscriber has taken up speaking. In these situations, the step sizes are set to zero, thus rendering the Wiener filter a through-connection. The passages $B_2$ and $A_2$ are to be regarded in a way similar to the phases just described.

Figure 17:
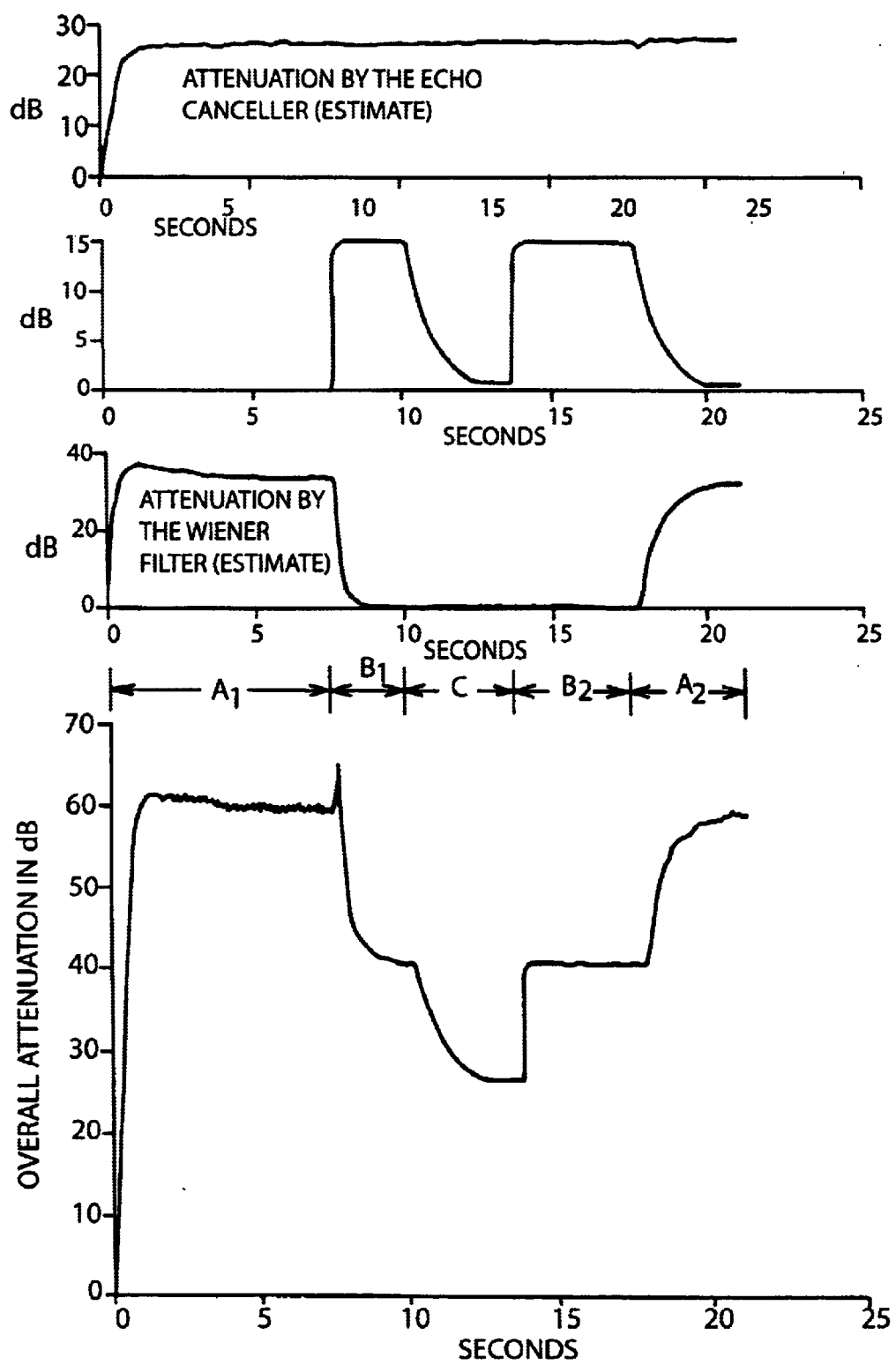
FIG. 17 shows the transfer of the attenuation values to the level discriminator.

Since the estimation of the attenuation which is introduced by the Wiener filter is carried out with different time constants, "cautious" estimation occurs in specific phases. In order to clarify this state of affairs, FIG. 17 plots the characteristics of the estimate of the attenuations by the echo cancellers and by the Wiener filter, as well as the reduction in the case of duplex. The sum of these three variables is transferred to the level discriminator and is illustrated in the lower part of FIG. 17. This estimate can be compared with the actual signal characteristics of the excitation and the error in the overall band in FIG. 18. In regions $B_1$ and $B_2$, the duplex detector detects the activity of the two subscriber ends, and increases the attenuation transfer by 15 dB. This increase is inserted with a short time constant, and extracted slowly again at the end of the duplex phase. This measure was introduced to bridge short voice pauses. At the same time, with the start of the duplex, the step size is reduced and the Wiener filter reduces its attenuation. The step size is set to zero in the passages without excitation (region C) of the remote subscriber—the Wiener filter thereby acts only as a time-delay element.

The method presented so far was, however, modified slightly once again for the final implementation—it was possible thereby to lower the computational outlay once again without obtaining marked losses in quality.

After determining the filter coefficients in the subband region as a function of step size, an upper limit of the attenuation was determined in accordance with equation 4.1. This upper limit was determined as a function of the attenuation already achieved, which is given by the power transfer factors in the respective band or by the duplex attenuation. In the step size calculation, both variables are calculated and stored only in logarithmic representation. Eight linearizations are therefore required in order to be able to use the variables in the limiting function. The determination of the maximum values would therefore require more computing power than the entire remaining calculation of coefficients. For this reason, a uniform upper limit was introduced for all bands. This limit is likewise calculated in accordance with equation 4.1, but with the overall band variables. The resources required for the post filtering resulting therefrom is far below 1 MIPS in the case of the use of 16-bit fixed point signal processors.

If a Wiener filter 30 is switched on, the overall attenuation can additionally be weakened by the attenuation of the Wiener filter 30. The maximum excursion of the level discriminator can therefore be specified by $$D_{PW}(k)=D_0-D_{EK}(k)-D_{GS}(k)-D_w(k) \qquad (4.3)$$

The variable $D_w(k)$ is determined in this case in accordance with $$D_W(k) = \begin{cases} D_W^{(r)}(k) & \text{if } k = W \\ D_{ES}(k-1) & \text{otherwise} \end{cases} \qquad (4.4)$$

where $i \in Z$

What is claimed is:

1. A method for improving acoustic sidetone suppression in hands-free telephones, which comprises:

providing a hands-free telephone with a level discriminator and a Wiener filter defined by a frequency-selective filter having a Wiener setting algorithm;

subjecting an outgoing signal to a frequency-selective echo cancellation process utilizing subband processing;

after the echo cancellation process, post filtering the outgoing signal in the wiener filter; and using a single controlled variable step-size vector $\overline{\alpha}(k)$ both to control the frequency-selective echo cancellation process and to control the Wiener filter.

2. The method according to claim 1, which comprises using, a plurality of different sampling rates.

3. The method according to claim 2, which comprises:

performing the echo-cancellation process with adaptive filters; and providing the Wiener filter with adaptive filters.

4. The method according to claim 1, which comprises:

performing the echo-cancellation process with adaptive filters; and providing the Wiener filter with adaptive filters.

5. The method according to claim 1, which comprises performing the echo-cancellation process with a filter bank in frequency subbands.

6. The method according to claim 1, which comprises using power-based estimates and correlation-based analyses to control both an adaptation and a step size.

7. The method according to claim 1, which comprises estimating power transmission factors in subbands in order to determine a step size.

8. The method according to claim 1, wherein:
   the echo-cancellation process supplies an estimated value for a return loss introduced by the echo-cancellation process; and
   the Wiener filter supplies an estimated value for a return loss introduced by the Wiener filter.

9. The method according to claim 8, which comprises using the estimated value from the echo-cancellation process and the estimated value from the Wiener filter to control an attenuation of the level discriminator.

10. The method according to claim 1, which comprises simultaneously detecting activity of both participants in a call.

11. The method according to claim 10, which comprises, in duplex communication, reducing an overall attenuation of the level discriminator.

* * * * *

UNITED STATES PATENT AND TRADEMARK OFFICE
CERTIFICATE OF CORRECTION

PATENT NO. : 6,834,108 B1 Page 1 of 1
DATED : December 21, 2004
INVENTOR(S) : Gerhard Schmidt It is certified that error appears in the above-identified patent and that said Letters Patent is hereby corrected as shown below:

<u>Title page,</u>
Item [87], should read as follows:
-- PCT Pub. No.:    WO99/41897
  PCT Pub. Date:    Aug. 19, 1999 --

Signed and Sealed this

Fifteenth Day of March, 2005

JON W. DUDAS
*Director of the United States Patent and Trademark Office*